United States Patent
Nakagawa

(10) Patent No.: US 10,140,577 B2
(45) Date of Patent: Nov. 27, 2018

(54) DATA PROCESSING METHOD AND APPARATUS

(71) Applicant: FUJITSU LIMITED, Kawasaki-shi, Kanagawa (JP)

(72) Inventor: Hiroshi Nakagawa, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 552 days.

(21) Appl. No.: 14/872,652

(22) Filed: Oct. 1, 2015

(65) Prior Publication Data

US 2016/0098430 A1 Apr. 7, 2016

(30) Foreign Application Priority Data

Oct. 2, 2014 (JP) .................................. 2014-204273
Sep. 29, 2015 (JP) .................................. 2015-191842

(51) Int. Cl.
G06F 17/30 (2006.01)
G06N 5/02 (2006.01)

(52) U.S. Cl.
CPC .................................... G06N 5/025 (2013.01)

(58) Field of Classification Search
CPC .......................... G06F 17/30699; G06N 5/025
See application file for complete search history.

(56) References Cited

U.S. PATENT DOCUMENTS

2012/0144251 A1 6/2012 Carey et al.
2014/0012796 A1* 1/2014 Petersen ............... H04L 41/069
706/47
2014/0012864 A1 1/2014 Nakagawa

FOREIGN PATENT DOCUMENTS

JP 2012-118928 6/2012
JP 2012-123783 6/2012
JP 2014-013510 1/2014

* cited by examiner

Primary Examiner — Robert W Beausoliel, Jr.
Assistant Examiner — Hau Hoang
(74) Attorney, Agent, or Firm — Fujitsu Patent Center

(57) ABSTRACT

A non-transitory computer-readable recording medium contains an event processing control program for event processing that processes received event data in accordance with processing rules and outputs output data. The program causes a computer to execute a process that includes obtaining first assessment values pertaining to output data by the event processing for a first type of events, periodically by a first period. A correlation coefficient value of first and second received event data is periodically calculated by a second period longer than the first period. The first and second received event data are received event data of the first type and of a second type different from the first type, respectively. A second filtering condition pertaining to the second received event data is set based on the correlation coefficient value and a first filtering condition that pertains to the first received data and is specified from the assessment values.

6 Claims, 19 Drawing Sheets

FIG.7A

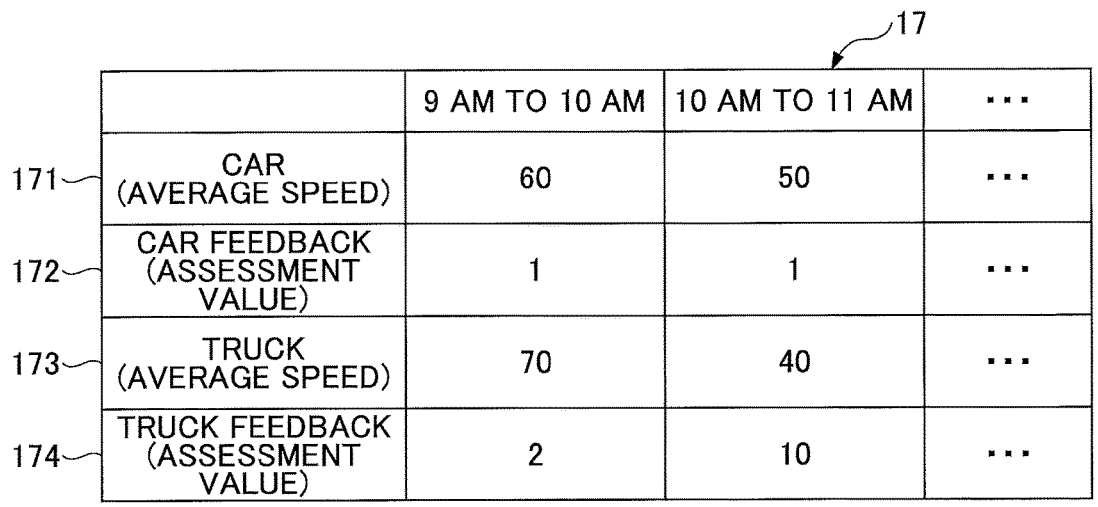

|  | 9 AM TO 10 AM | 10 AM TO 11 AM | ... |
|---|---|---|---|
| 171 — CAR (AVERAGE SPEED) | 60 | 50 | ... |
| 172 — CAR FEEDBACK (ASSESSMENT VALUE) | 1 | 1 | ... |
| 173 — TRUCK (AVERAGE SPEED) | 70 | 40 | ... |
| 174 — TRUCK FEEDBACK (ASSESSMENT VALUE) | 2 | 10 | ... |

FIG.7B

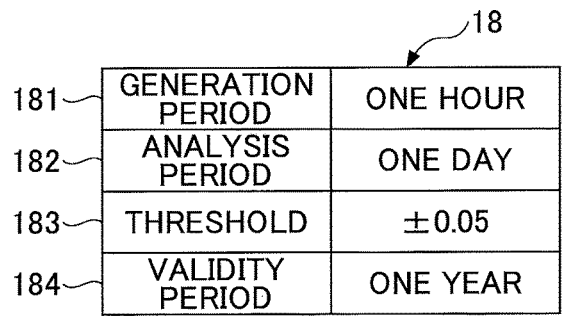

| | 18 |
|---|---|
| 181 — GENERATION PERIOD | ONE HOUR |
| 182 — ANALYSIS PERIOD | ONE DAY |
| 183 — THRESHOLD | ±0.05 |
| 184 — VALIDITY PERIOD | ONE YEAR |

FIG.7C

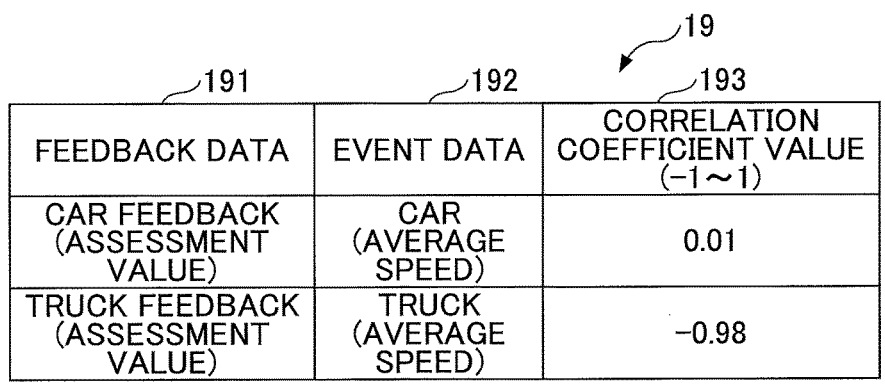

| 191 FEEDBACK DATA | 192 EVENT DATA | 193 CORRELATION COEFFICIENT VALUE (−1〜1) |
|---|---|---|
| CAR FEEDBACK (ASSESSMENT VALUE) | CAR (AVERAGE SPEED) | 0.01 |
| TRUCK FEEDBACK (ASSESSMENT VALUE) | TRUCK (AVERAGE SPEED) | −0.98 |

FIG.15A

|  | 9 AM TO 10 AM | 10 AM TO 11 AM | ... |
|---|---|---|---|
| 171 — CAR (AVERAGE SPEED) | 70 | 40 | ... |
| ... | ... | ... | ... |
| 175 — MOTORBIKE (AVERAGE SPEED) | 80 | 50 | ... |

| NEW EVENT DATA (194) | EXISTING EVENT DATA (195) | CORRELATION COEFFICIENT VALUE (−1~1) (293) |
|---|---|---|
| MOTORBIKE (SPEED) | CAR (SPEED) | 0.95 |
|  | XXX | 0.01 |
|  | XXX | X.XX |

| | 9 AM TO 10 AM | 10 AM TO 11 AM | ... |
|---|---|---|---|
| 173 — TRUCK (AVERAGE SPEED) | 70 | 40 | ... |
| ... | ... | ... | ... |
| 175 — MOTORBIKE (AVERAGE SPEED) | 80 | 50 | ... |

FIG.17B

| NEW EVENT DATA (194) | EXISTING EVENT DATA (195) | CORRELATION COEFFICIENT VALUE (−1 ~ 1) (293) |
|---|---|---|
| MOTORBIKE (SPEED) | TRUCK (SPEED) | 0.95 |
| | XXX | 0.01 |
| | XXX | X.XX |

DATA PROCESSING METHOD AND APPARATUS

CROSS-REFERENCE TO RELATED APPLICATIONS

This application is based upon and claims the benefit of priority of the prior Japanese Patent Applications No. 2014-204273, filed on Oct. 2, 2014, and No. 2015-191842, filed on Sep. 29, 2015, the entire contents of which are incorporated herein by reference.

FIELD

A certain aspect of the embodiments discussed herein is related to data processing methods and apparatuses.

BACKGROUND

Complex event processing (CEP) systems have been known as a technique to process big data that are momentarily collected from various objects. The CEP engine, for example, performs processing (hereinafter also referred to as "event processing") on multiple data items received from various objects in accordance with a predetermined rule, and successively outputs the results of the event processing to an output destination.

The big data include data from which effective data to be output to the output destination are not extractable by the event processing. That is, the big data include data that are necessary and data that are unnecessary to the CEP system. Data from which effective data to be output to the output destination are not extractable do not have to be input to the event processing.

In response to this, if a manager manually sorts necessary data from unnecessary data, the manager's work increases to increase an operational cost. Furthermore, because the sorting of data depends on the manager's personal skill, it is possible that necessary data and unnecessary data are not properly filtered so that an operational load on the system remains high.

Therefore, a technique to monitor event processing on events of individual event types stored in a reception buffer and reduce the number of events to be stored in the reception buffer based on the degree of importance of each event type determined based on the result of the monitoring has been known. (See, for example, Japanese Laid-Open Patent Publication No. 2012-118928.)

SUMMARY

A non-transitory computer-readable recording medium contains an event processing control program for event processing that processes received event data in accordance with processing rules and outputs output data. The event processing control program causes a computer to execute a process that includes obtaining first assessment values pertaining to output data by the event processing for a first type of events, periodically by a first period, calculating a correlation coefficient value of first received event data and second received event data periodically by a second period that is longer than the first period, the first received event data being received event data of the first type and the second received event data being received event data of a second type that is different from the first type of events, and setting a second filtering condition pertaining to the second received event data, based on a first filtering condition and the correlation coefficient value, the first filtering condition pertaining to the first received data and being specified from the assessment values.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIGS. 7A, 7B and 7C are diagrams illustrating a time-series data table, a settings table, and a first correlation table, respectively, according to an embodiment;

FIGS. 15A and 15B are diagrams illustrating a time-series data table and a second correlation table, respectively, according to an embodiment;

FIGS. 17A and 17B are diagrams illustrating a time-series data table and a second correlation table, respectively, according to an embodiment;

DESCRIPTION OF EMBODIMENTS

Figure 1:
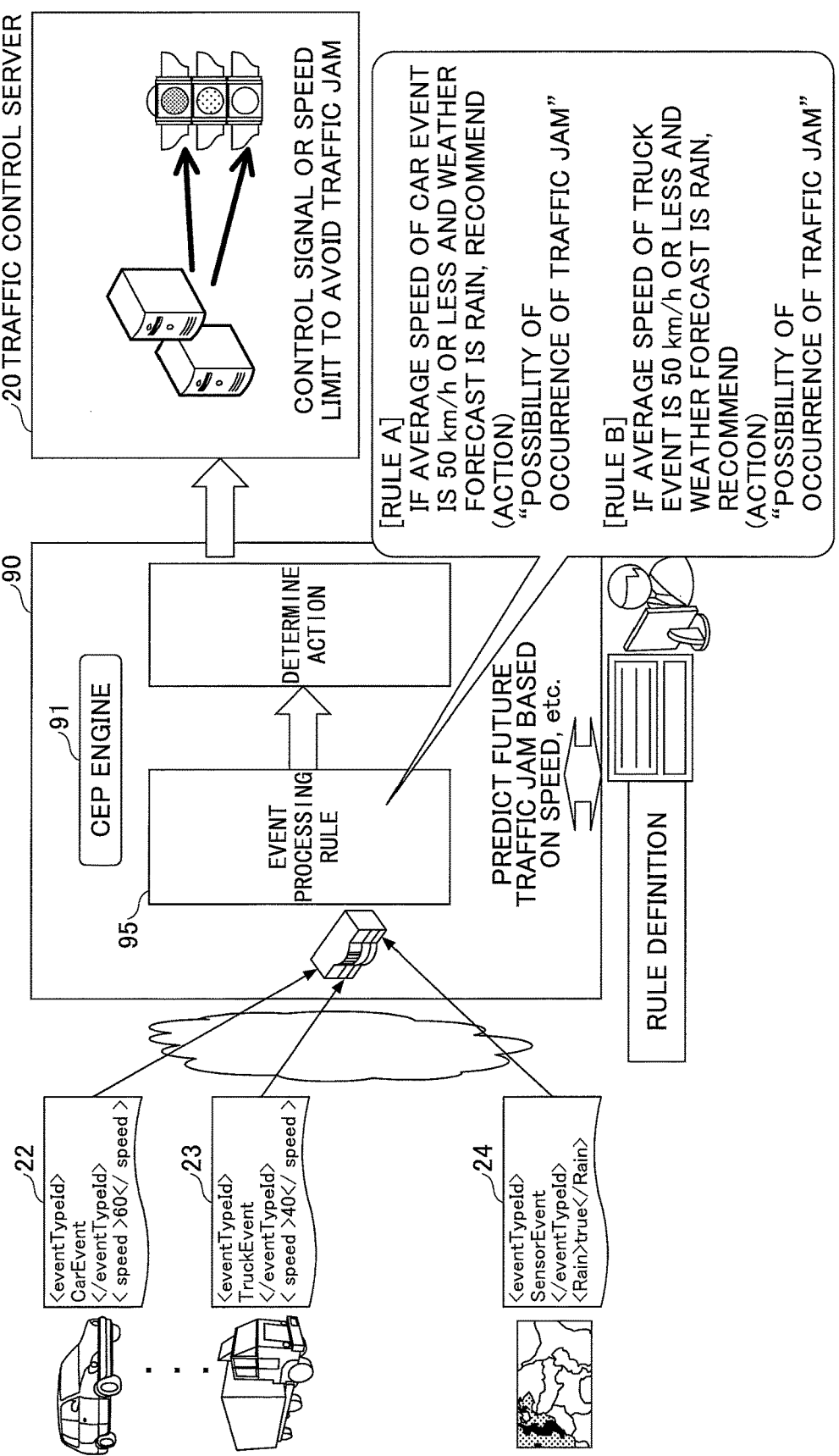
FIG. 1 is a schematic diagram illustrating a streaming process.

According to the CEP system, the determination as to whether data are to be input during event processing changes during the operation of the CEP system, so that the optimality of the initially determined rule may degrade with the passage of time. The case where "Car Event", determined as unnecessary data at the beginning of the operation, changes to necessary data during the operation may be taken as an example.

On the other hand, when the rule for discarding received events is stationary as in Japanese Laid-Open Patent Publication No. 2012-118928, necessary data may be discarded before event processing or it is impossible to discard unnecessary data before event processing. In the case where necessary data are discarded before event processing, it is possible to reduce the load of event processing, but the usefulness and validity of the result of the event processing decrease. Furthermore, in the case where unnecessary data are not discarded before event processing, it is impossible to reduce a load on the system.

For example, when all the data of received events are input to event processing, a load on the CEP engine that performs the event processing increases, so that it becomes necessary to enhance the capability of the CEP system, thus resulting in a higher operational cost. Furthermore, it is difficult to enhance the capability of the CEP system such that the CEP system swiftly adapts to the amount of input data that has been rapidly increasing recently.

According to an aspect of the invention, it is possible to suitably set a filtering condition for filtering received events before subjecting the received events to event processing based on a predetermined rule.

Preferred embodiments of the present invention will be explained with reference to accompanying drawings. In the specification and the drawings, elements having substantially the same functional configuration are referred to by the same reference numeral, and are not repetitively described.

An overview of a streaming process is given with reference to FIG. 1 before describing a CEP system according to an embodiment of the present invention. A server apparatus 90 that performs event processing in a CEP system is able to communicate with a traffic control server 20 that performs road traffic control via a network.

The data of multiple events collected from various objects are delivered to the server apparatus 90. FIG. 1 illustrates the data of a car event (CarEvent), a truck event (TruckEvent), and a sensor event (SensorEvent), which are of different event types, as examples of multiple data for event processing. The events, however, are not limited to these, and may include various types of events. For example, the information of the events may include sensor information collected from sensors such as a temperature sensor, a photodetection sensor, an acceleration sensor, and a pressure sensor, and information collected from apparatuses such as home appliances.

A CEP engine 90 operates in the server apparatus 90. The CEP engine 91 is software that implements complex event processing (hereinafter also referred to as "event processing") that processes the data of received events in accordance with a predetermined rule. Examples of software that implements complex event processing include Esper. The complex event processing may also be referred to as event stream processing (ESP). Here, the complex event processing and the event stream processing are collectively referred to as CEP.

The server apparatus 90 stores an event processing rule 95 that determines a condition in the case of performing event processing on multiple events. In the case of FIG. 1, the server apparatus 90 stores Rule A and Rule B as examples of the event processing rule 95.

Rule A represents the condition of the car event that the average speed is 50 km/hour or less and the weather is rain. Rule B represents the condition of the truck event that the average speed is 50 km/hour or less and the weather is rain. The event processing rule 95 is, for example, manually set by a manager of the CEP system.

The server apparatus 90 receives delivered data 22, 23 and 24. The CEP engine 91 processes the data 22, 23 and 24 in accordance with the event processing rule 95 (Rules A and B). When the car event satisfies Rule A or the truck event satisfies Rule B, the CEP engine 91 determines the action of "Possibility of Occurrence of Traffic Jam" and transmits the determined action of "Possibility of Occurrence of Traffic Jam" to the traffic control server 20 in order to recommend the determined action.

In response to reception of the recommendation transmitted from the server apparatus 90, the traffic control server 20 determines that the occurrence of a traffic jam is predicted on a road that is monitored for traffic conditions, and performs control to alleviate the traffic jam. For example, the traffic control server 20 performs control to increase a green light period for a road on which the occurrence of a traffic jam is predicted with respect to a traffic light provided on the roads that are monitored, so as to allow a larger number of cars to pass through the roads that are monitored. Furthermore, for example, the traffic control server 20 performs control to avoid a traffic jam by urging cars to divert to other roads by announcing traffic information to the effect that a traffic jam is predicted on the road that is monitored.

The big data include data from which effective information to be output to an output destination is not extractable by the event processing. That is, the big data include data that are necessary and data that are unnecessary to the CEP engine 91.

Figure 2:
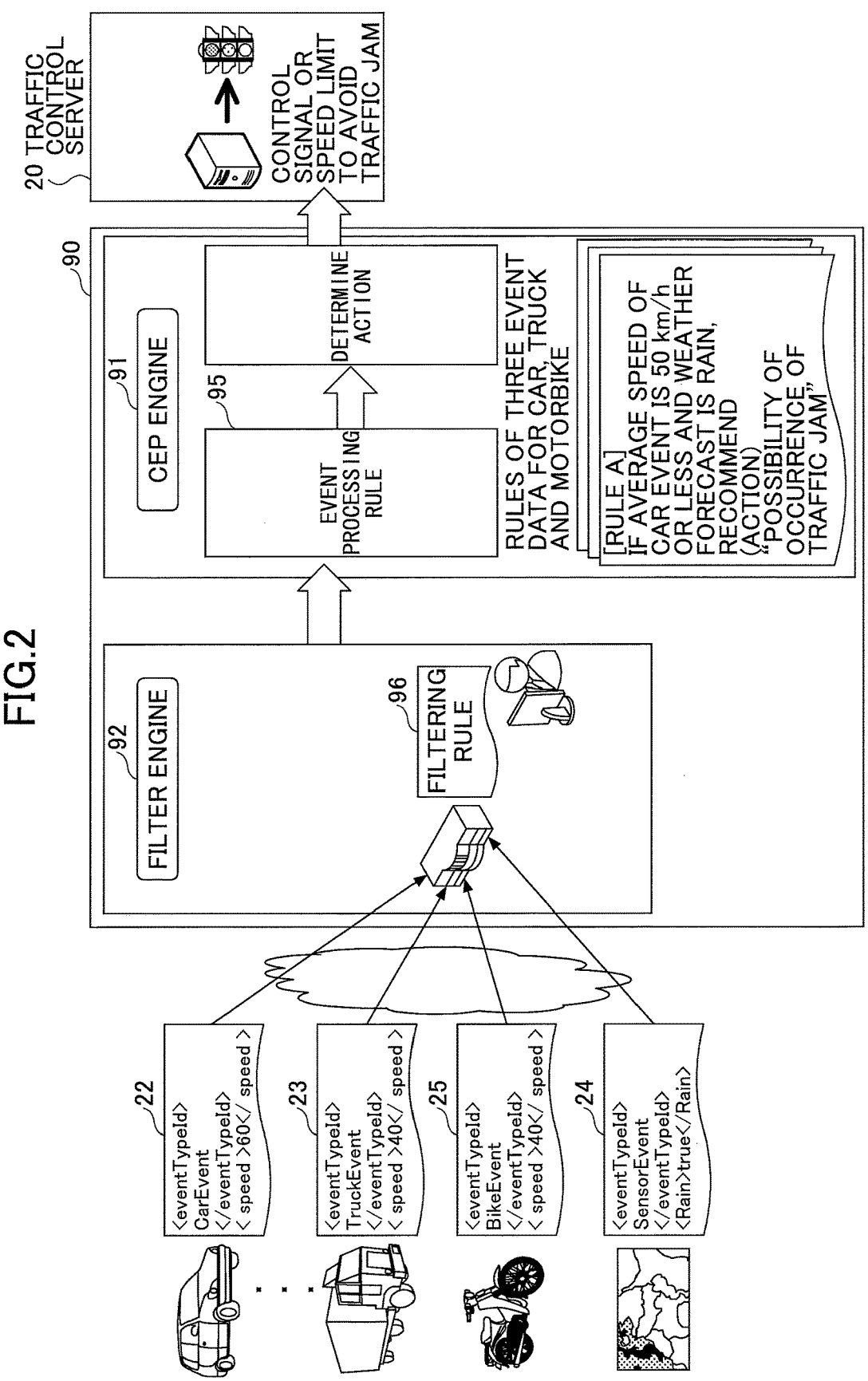
FIG. 2 is a diagram illustrating a CEP system.

Consideration is given of the case where, in response to this, a filtering rule 96 (filtering condition) is manually set by a manager as illustrated in FIG. 2. In this case, a filter engine 92 removes data that satisfy the filtering rule 96 as unnecessary data from the delivered speed data 22 and 23 and weather data 24 and newly delivered speed data 25 of a motorbike event (BikeEvent), and outputs only remaining data to the CEP engine 91. When the manager manually sorts necessary data from unnecessary data, however, the manager's work increases to increase an operational cost. Furthermore, because the sorting of data depends on the manager's personal skill, it is possible that necessary data and unnecessary data are not properly filtered so that an operational load on the system remains high.

On the other hand, when the CEP engine 91 performs event processing on all the data of received events without performing any filtering, an operational load on the CEP engine 91 increases. It is difficult to enhance the CEP system such that the CEP system swiftly adapts to the amount of input data that has been rapidly increasing recently.

Figure 3:
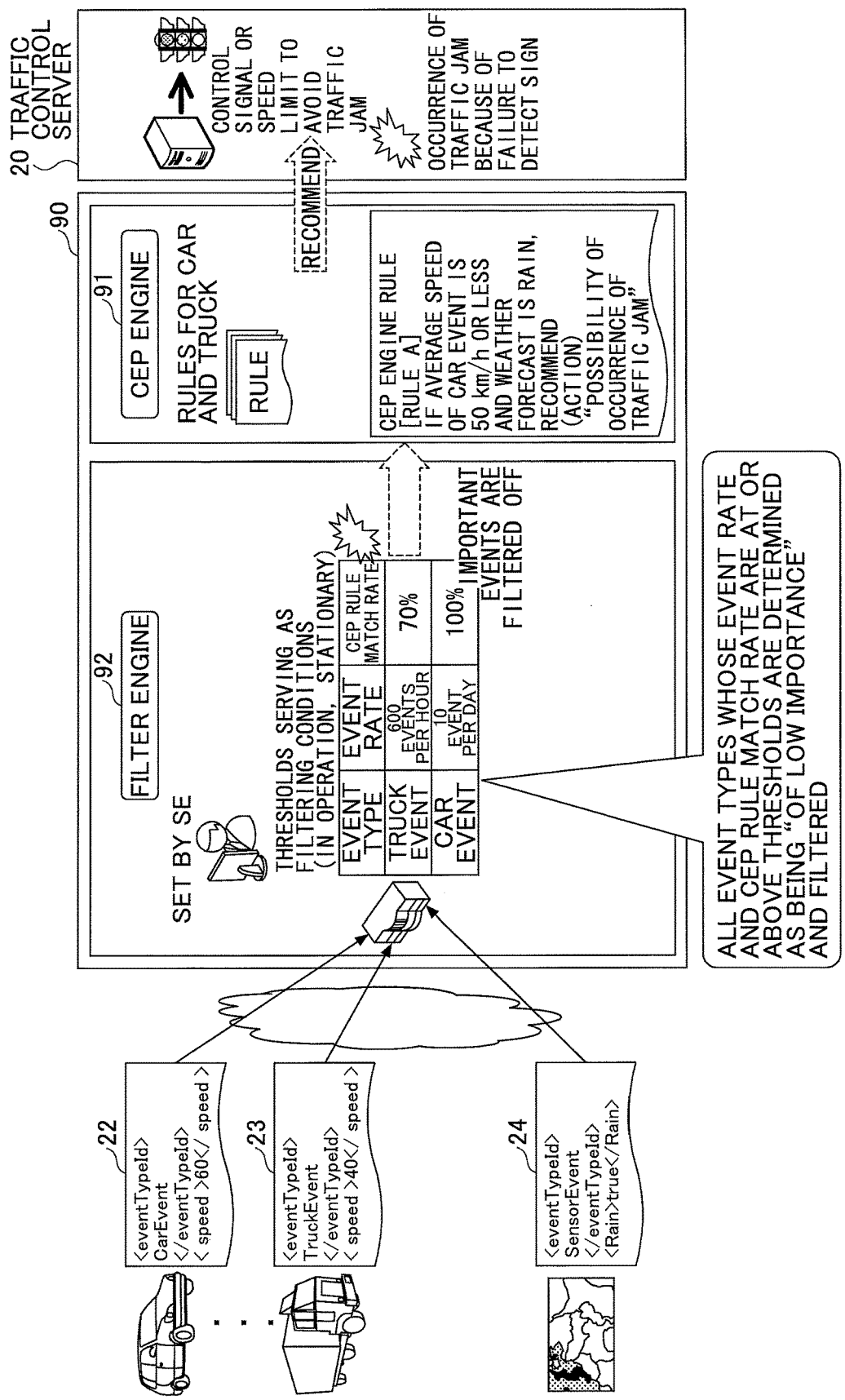
FIG. 3 is a diagram for illustrating a problem of the CEP system.

Consideration is given further of the case where a threshold serving as the filtering condition of the filter engine 92 is a fixed value as illustrated in FIG. 3. In this case, the filter engine 92 determines that the speed data 23 of the truck event is an event of low importance when the number of inputs of the speed data 23 exceeds 600 events per hour and the match rate of a CEP rule exceeds 70%. As a result, such speed data 23 is filtered out and is not input to the CEP engine 91.

When a stationary filter and a filter corresponding to a conformance rate for each of the received events (truck event and car event), such as the event rate and the match rate of FIG. 3, are provided before the CEP engine 91, it is possible to reduce an operational load on the CEP engine 91. On the other hand, when the initially set rule (filtering condition) becomes no more a proper rule with the passage of time, the above-described stationary filter or filter corresponding to a conformance rate is prevented from being adapted, so that the usefulness and validity of the output result of the CEP engine 91 decrease. In particular, when the filter of the CEP engine 91 is not responsive to a change in the level of importance of the received event, the filter becomes no more suitable.

For example, the event rate of the truck event changes greatly. Depending on the time of day, a day of the week, or a season, the event rate of the truck event is constantly 600 events per hour or more, so that many events of the truck event that are supposed to be processed by the CEP engine 91 (that is, important events) may be filtered out. This significantly decreases the usefulness and validity of the output result of the CEP engine 91. As a result, the CEP engine 91 fails to detect a sign of a traffic jam and is accordingly prevented from transmitting a useful recommendation, so that a traffic jam may occur.

On the other hand, when data to be fed to the CEP engine 91 by the filter engine 92 are not reduced too much in order to maintain the usefulness and validity of the output result of the CEP engine 91, it is impossible to reduce an operational load on the CEP engine 91.

Figure 4:
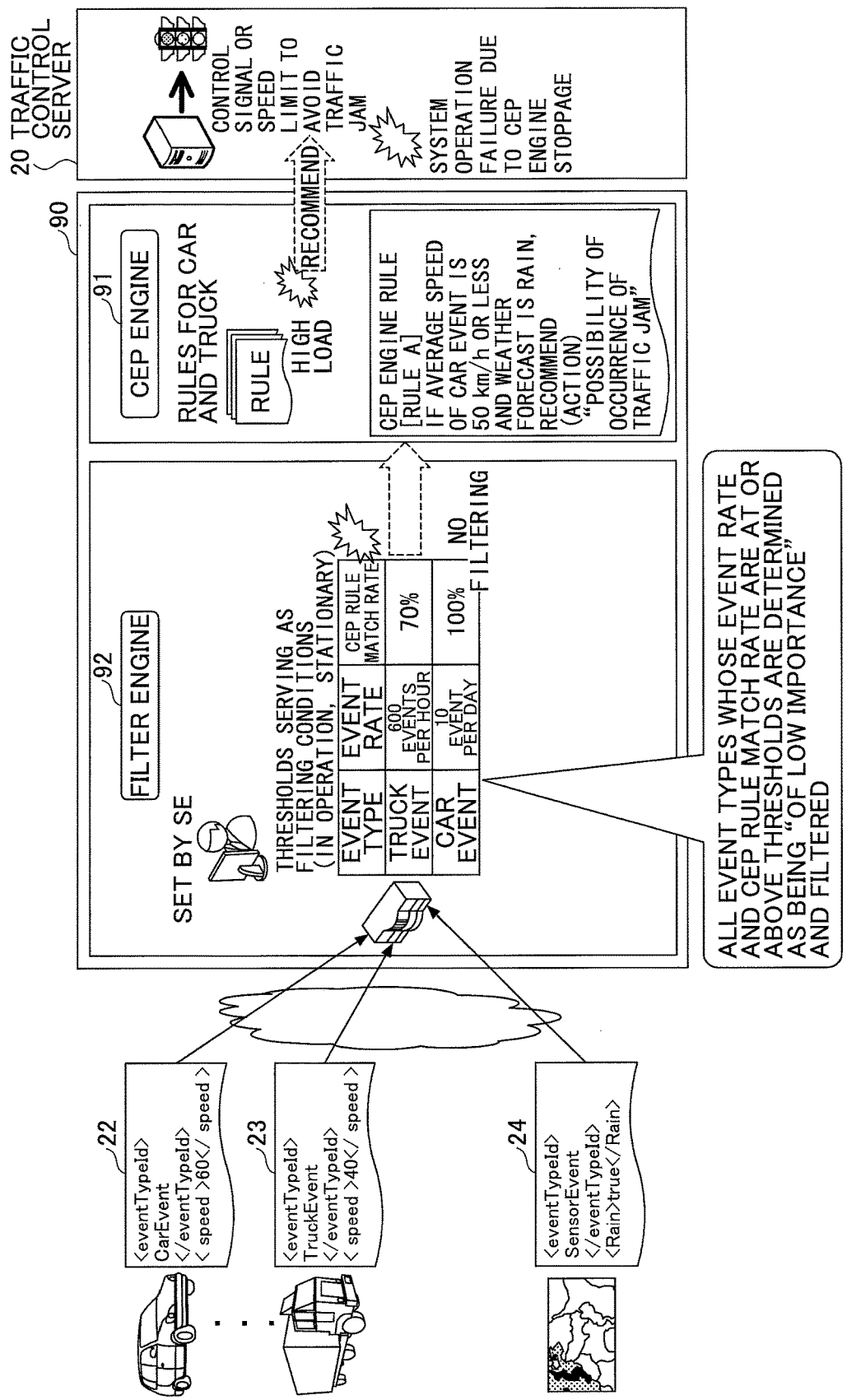
FIG. 4 is a diagram for illustrating a problem of the CEP system.

Like in the case of FIG. 3, in the case of FIG. 4, the filter engine 92 determines that the speed data 23 of the truck event is an event of low importance when the number of inputs of the speed data 23 exceeds 600 events per hour and the match rate of a CEP rule exceeds 70%. As a result, such speed data 23 is filtered out and is not input to the CEP engine 91.

For example, when a truck event is an unimportant event irrelevant to a cause of a traffic jam, or when a truck event changes to an unimportant event during the operation, the speed data 23 of the truck event that is supposed to be removed by filtering is input to the CEP engine 91 without being filtered out. As a result, an operational load on the CEP engine 91 increases so as to be more than the CEP engine 91 is capable of handling, so that the system stops operating.

According to an aspect of the present invention, a CEP system capable of properly setting a filtering condition for removing events before subjecting received events to event processing based on a predetermined rule is provided. In the following, a description is first given of a functional configuration of a server apparatus 10 and a description is then given of operations of a CEP system including the server apparatus 10 and processes executed by the CEP system.

Figure 5:
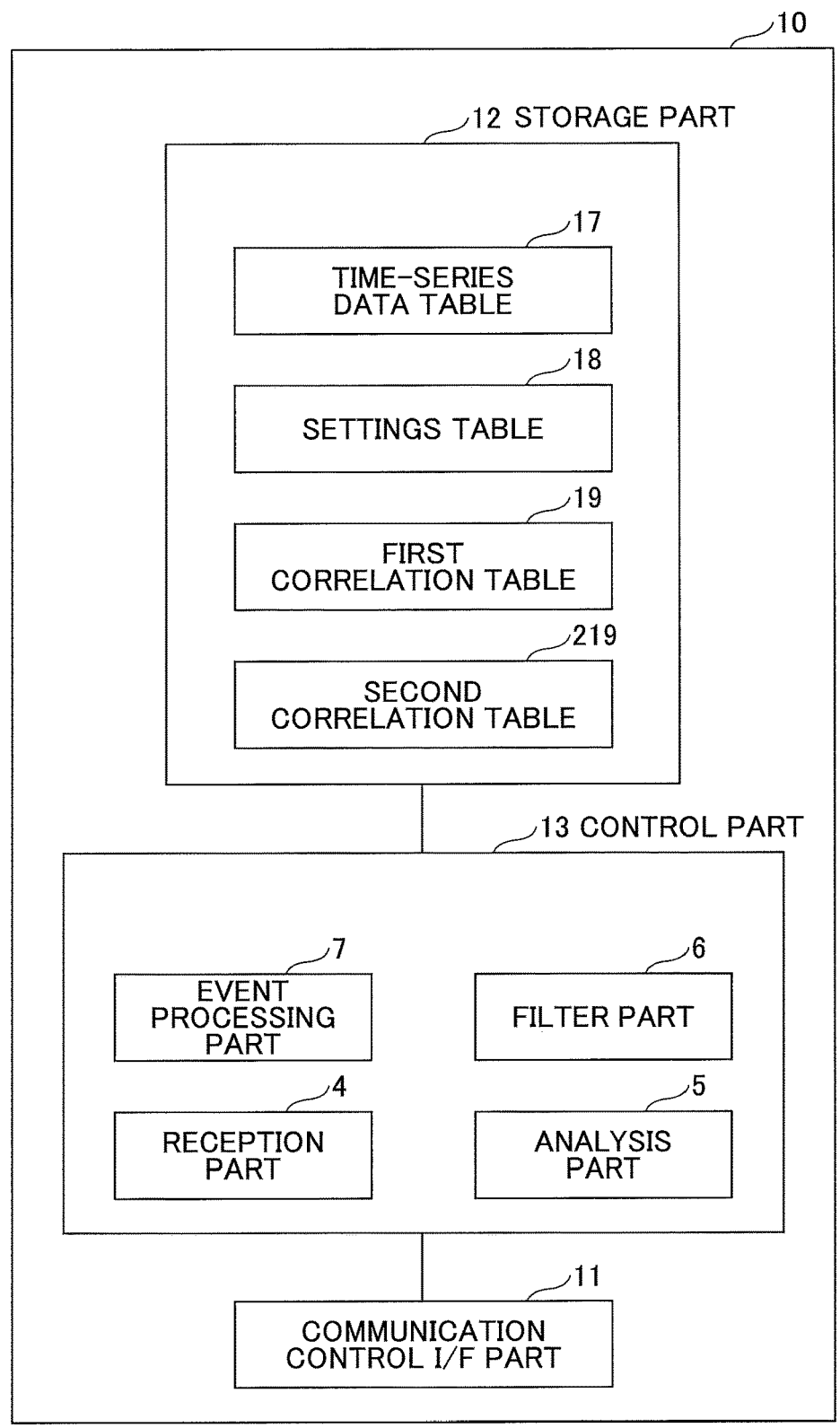
FIG. 5 is a diagram illustrating a functional configuration of a server apparatus according to an embodiment.

A description is given, with reference to FIG. 5, of a functional configuration of a server apparatus according to an embodiment of the present invention. The server apparatus 10 is a data processing apparatus that performs event processing on received events in accordance with a predetermined rule and sequentially outputs the events subjected to the event processing. Hereinafter, performing event processing on events may be referred to as "event-processing events."

The server apparatus 10, which is a physical server that performs complex event processing, is, for example, a data sensor or a server computer installed in a company. Data collected from various objects are delivered to the server apparatus 10. The server apparatus 10 filters the data of multiple kinds of events received from various objects with a preset filtering condition. Next, the server apparatus 10 performs event processing on data other than those removed by the filtering, generates a recommendation according to the result of the processing, and outputs the generated recommendation to an output destination.

The server apparatus 10 includes a communication control interface (I/F) part 11, a storage part 12, and a control part 13. The communication control interface (I/F) part 11 includes at least one port, and controls communications with a network. The communication control I/F part 11 receives the data of events delivered from various objects via the network. For example, the communication control I/F part 11 receives the speed data 22 of a car event, the speed data 23 of a truck event, and the weather data 24 of a sensor event illustrated in FIG. 6. Furthermore, the communication control I/F part 11 transmits and receives various kinds of data to and from the traffic control server 20. For example, the communication control I/F part 11 determines an action to be recommended when the CEP engine 15 determines that data match an event processing rule, and transmits data to be recommended to the traffic control server 20.

The storage part 12 is a storage device such as a hard disk or an optical disk. The storage part 12 stores various kinds of data. For example, the storage part 12 stores an operating system (OS) that is executed in the control part 13 and a program that executes various kinds of processes such as event processing, an automatic generation process, and a correlation analysis process to be described below. Furthermore, the storage part 12 stores various kinds of data required for execution of a program in the control part 13.

The storage part 12 stores the data of a time-series data table 17, a settings table 18, a first correlation table 19, and a second correlation table 219. The storage part 12 generates time-series data and stores the generated data in the time-series data table 17. The time-series data table of FIG. 7A stores hourly average speed data 171 of the car event, an hourly assessment value (feedback value) 172 of the car event, hourly average speed data 173 of the truck event, and an hourly assessment value (feedback value) 174 of the truck event. For example, the assessment value 172 is an indicator of whether a traffic jam has actually been avoided as a result of having controlled a traffic signal or a speed limit in response to a recommendation from the CEP engine 15 resulting from the car event.

The settings table 18 stores a generation period 181 of an assessment value (a first period), an analysis period 182 of assessment values (a third period), a threshold 183, and a validity period 184 as illustrated in FIG. 7B. The analysis period 182 is longer than the generation period 181. By causing the analysis period 182 to be longer than the generation period 181, it is possible to make the number of data items of assessment values to be analyzed more than or equal to a predetermined number, so that it is possible to increase the accuracy of the analysis result.

The first correlation table 19 stores feedback data (assessment values) 191, event data 192, and a correlation coefficient value 193 as illustrated in FIG. 7C. The correlation coefficient value 193 indicates the correlation between the feedback data 191 and the event data 192.

For example, when the event is the car event, the correlation coefficient value 193 indicating the correlation between the feedback data 191 and the event data 192 is calculated from one day's data of the hourly assessment value (feedback value) 172 of the car event and one day's data of the hourly average speed data 171 of the car event stored in the time-series data table illustrated in FIG. 7A.

Examples of the method of calculating the correlation coefficient value 193 includes the following expression (1). When a data string formed of two sets of numerical values (x, y) is given, their correlation coefficient value is determined by the expression (1). In the calculation of the correlation coefficient value 193, the hourly average speed of the car event is substituted for x and the hourly assessment value of the car event is substituted for y. Furthermore, in the calculation of the correlation coefficient value 193, the data string formed of two sets of numerical values (x, y)

represents one day's data string of (x, y), which is the set of the hourly average speed of the car event and the hourly assessment value of the car event. The same applies to the truck event.

$$\frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

The method of calculating correlation, however, is not limited to this, and any known method of calculating correlation may be used.

Referring back to FIG. 5, the control part 13 includes an internal memory for storing programs that define various kinds of processing procedures and control data, with which the control part 13 executes various kinds of processes. The control part 13 includes a reception part 4, an analysis part 5, a filter part 6, and an event processing part 7.

The reception part 4 receives various kinds of data including events via the network. The reception part receives an assessment value that the traffic control server 20 generates by assessing a recommendation transmitted from the server apparatus 10. The reception part 4 is an obtaining part that obtains, every first period, the assessment value of data subjected to event processing based on an event processing rule to be described below. A predetermined time such as one hour is determined as the first period. The first period is preset by the manager.

The analysis part 5 calculates, with respect to each event type, the correlation coefficient value 193 of data among data for event processing and the assessment values of the data in the third period longer than the first period. The calculated correlation coefficient value 193 is stored in the first correlation table 19 of FIG. 7C. Furthermore, the analysis part 5 calculates a correlation coefficient value 293 of data of a first event type and data of a second event type among data for event processing in a second period longer than the first period. The calculated correlation coefficient value 293 is stored in the second correlation table 219 of FIG. 15B. Examples of the data for event processing of the first event type and the data for event processing of the second event type include the speed data of the car event and the speed data of the truck event.

The analysis part 5 generates a filtering rule (filtering condition) that filters the data of received events based on the correlation coefficient value 193 or the correlation coefficient value 293.

The filter part 6 filters the data of multiple events based on one or more filtering rules before the events are event-processed by a CEP engine 15. The filter part 6 discards a filtering condition that is beyond (more than) the validity period of the filtering condition. The filter part 6 sets a second filtering condition pertaining to the data for event processing of the second event type based on a first filtering condition pertaining to the data for event processing of the first event type specified from assessment values and on the above-described correlation coefficient value 293.

The event processing part 7 performs event processing (complex event processing: CEP) on the output data of the filter part 6 (the event data that have not been filtered out). The event processing part 7 transmits the recommendation of "Possibility of Occurrence of Traffic Jam" to the traffic control server 20 when the input data match an event processing rule. The recommendation of "Possibility of Occurrence of Traffic Jam" is an example of the recommendation that is output to an output destination as a result of the event processing of an input event by the server apparatus 10.

In the CEP system of FIG. 6 described below, an analysis engine 16 corresponds to the analysis part 5 that calculates a correlation coefficient value with respect to each received event based on the correlation in the third period longer than the first period between the assessment value of every first period and the data of each received event. Furthermore, the analysis engine 16 corresponds to the reception part 4 that receives the assessment value of each first period of the event-processed data.

Furthermore, a filter engine 14 corresponds to the filter part 6 that filters input data based on a filtering condition.

Furthermore, the CEP engine 30 corresponds to the event processing part 7 that processes the output data of the filter part 6 (the event data that have not been filtered out) based on an event processing rule.

Figure 6:
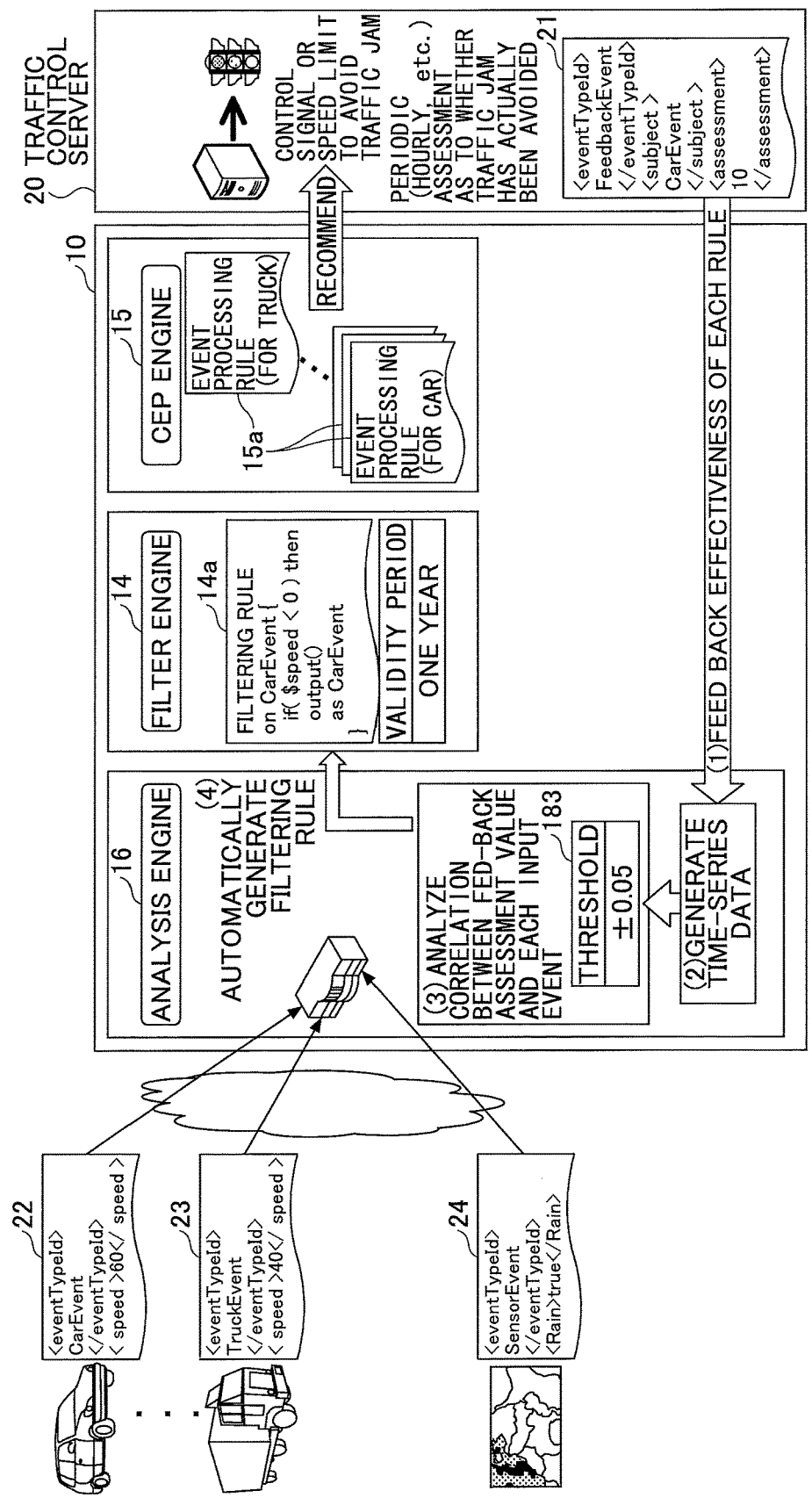
FIG. 6 is a diagram for illustrating an automatic analysis (feedback) of a correlation according to an embodiment.

Next, an overview is given, with reference to FIGS. 6 and 7, of operations of a CEP system including a server apparatus. In the following, a description is given, taking the car event, the truck event, and the weather forecast event as examples of the big data. For example, the speed data 22 that indicate the speed of a car detected with a speed sensor provided at a predetermined position on a road that is an object of monitoring for traffic conditions is delivered to the server apparatus 10 as an example of the car event. Likewise, the speed data 23 that indicate the speed of a truck detected with a speed sensor provided at a predetermined position on a road that is an object of monitoring for traffic conditions is delivered to the server apparatus 10 as an example of the truck event. Furthermore, the weather data 24 that indicate the predicted weather of a region including a road that is an object of monitoring is delivered from a server of a weather forecast service provider to the server apparatus 10 as an example of the weather forecast event.

First, the analysis engine 16 receives multiple input events including the speed data 22 of the car event, the speed data 23 of the truck event, and the weather data 24 of the weather forecast event. The analysis engine 16 generates time-series data from the input events, and adds the generated data to the time-series data table 17. As a result, as illustrated in FIG. 7A, time-series data are collected with respect to each input event type, so that the average speed is calculated with respect to each input event type.

Referring back to FIG. 6, the speed data 22 and 23 and the weather data 24 have a data structure of XML (Extensible Markup Language) format. The speed data 22 have items whose data names are "eventTypeId" and "speed" as tags. The tags of "eventTypeId" are used to embed the type of an event that has occurred. In the speed data 22, "CarEvent" that indicates passage of a car is embedded in the "eventTypeId" tags as an event that has occurred. The tags of "speed" are used to embed detected speed. In the speed data 22, a value indicating per hour speed (Km/h) is embedded in the "speed" tags as the detected speed of a car. The speed data 22 indicate that the speed of a car is 40 Km/h.

The speed data 23 have items whose data names are "eventTypeId" and "speed" as tags. In the speed data 23, "TruckEvent" that indicates passage of a truck is embedded in the "eventTypeId" tags as an event that has occurred. The tags of "speed" are used to embed detected speed. In the speed data 23, a value indicating per hour speed (Km/h) is embedded in the "speed" tags as the detected speed of a truck. The speed data 23 indicate that the speed of a truck is 40 Km/h.

Furthermore, the weather data 24 have items whose data names are "eventTypeId" and "Rain" as tags. As described above, the tags of "eventTypeId" are used to embed the type of an event that has occurred. In the weather data 24, "SensorEvent" is embedded in the "eventTypeId" tags as an event that has occurred. The tags of "Rain" are used when rain is forecast. In the weather data 24, "true" is embedded in the "Rain" tags when rain is forecast. Here, the weather data 24 indicate that rain is forecast.

The analysis engine 16 outputs an input event to the filter engine 14. The filter engine 14 inputs the input event and filters the input event based on a filtering rule 14a. The filter engine 14 outputs data that have not been filtered out to the CEP engine 15. It is assumed that at this point, the filtering rule 14a (filtering condition) of FIG. 6 has not been automatically generated. A filtering process executed by the filter engine 14 after automatic generation of the filtering rule 14a is described below.

The CEP engine 15 inputs the data of the car event, the truck event, and the weather forecast event, and performs event processing in accordance with event processing rules 15a. The event processing rules 15a are set one for each event. For example, the CEP engine 15 performs event processing on the speed data 22 of the car event based on the event processing rule 15a for the car event. Likewise, the CEP engine 15 performs event processing on the speed data 23 of the truck event based on the event processing rule 15a for the truck event. Likewise, the CEP engine 15 performs event processing on the weather data 24 of the weather forecast event based on the event processing rule 15a for the weather forecast event. By thus performing event processing with respect to each event type, it is possible for the CEP engine 15 to perform assessment with respect to each event type.

For example, it is assumed that the event processing rule 15a for the car event is the condition that the average speed of the car event is 50 km/h or less and the weather is rain. The CEP engine 15 transmits the information (recommendation) of "Possibility of Occurrence of Traffic Jam" to the traffic control server 20 when this rule is satisfied.

It is possible for the CEP system to preset an event to be assessed and an event not to be assessed. The CEP engine 15 does not perform event processing on those not to be assessed among the input events. For example, it is possible to determine that the car event is to be assessed and the weather forecast event is not to be assessed in a system operation. According to this embodiment, each of the car event, the truck event, and the weather forecast event is determined as an object of assessment.

In response to receiving the recommendation of "Possibility of Occurrence of Traffic Jam" from the server apparatus 10, the traffic control server 20 determines that the occurrence of a traffic jam is predicted on a road that is monitored for traffic conditions, and performs control to alleviate the traffic jam. For example, the traffic control server 20 performs control to increase a green light period for a road on which the occurrence of a traffic jam is predicted with respect to a traffic light provided on the roads that are monitored, or control on a speed limit, so as to allow a larger number of cars to pass through the roads that are monitored. Furthermore, for example, the traffic control server 20 performs control to avoid a traffic jam by urging cars to divert to other roads by announcing traffic information to the effect that a traffic jam is predicted on the road that is monitored.

A description is given above of the process where the server apparatus 10 inputs an input event, executes filtering and event processing, and transmits a recommendation to the traffic control server 20 based on the result of the processing in the CEP system.

Next, a description is given of a process where the server apparatus 10 receives the feedback of assessment of the "recommendation" from the traffic control server 20, automatically analyzes the correlation between the fed-back assessment values and the input event, and automatically generates the filtering rule 14a from the result of the analysis. Automatic generation of the filtering rule 14a makes it possible to automatically sort data that need to be event-processed in the CEP engine 15 from data that do not need to be event-processed in the CEP engine 15, thus making it possible to reduce an operational load on the CEP engine 15.

(1) Feedback of Effectiveness of Event Processing Rule for Each Event

The traffic control server 20 assesses whether a traffic jam has actually been avoided by the above-described control for avoiding the traffic jam, and feeds back the assessment value to the server apparatus 10. For example, assessment value data 21 transmitted by the traffic control server 20 illustrated in FIG. 6 are generated for each event processing rule 15a (for a car, a truck, etc.). According to this embodiment, the assessment period (first period) is set to one hour preset in the generation period 181 of FIG. 7B, while the assessment period is not limited to this and may be set to any fixed time. For example, according to this embodiment, the traffic control server 20 calculates an hourly assessment value for the car event and an hourly assessment value for the truck event.

The assessment value data 21 have items whose data names are "eventTypeId," "subject," and "assessment" as tags. The tags of "eventTypeId" are used to embed the type of an event that has occurred. In the assessment data 21, "FeedbackEvent" that returns an hourly assessment value to the server apparatus 10 is embedded in the "eventTypeId" tags. The assessment value indicates whether a traffic jam has actually been avoided as a result of having controlled a traffic signal or a speed limit in response to a recommendation from the server apparatus 10. Furthermore, "subject" indicates an event that has caused generation of "FeedbackEvent." Here, "CarEvent" is embedded in "subject." An assessment value (feedback value) for each event is embedded in "assessment." Here, "assessment" indicates that the fed-back assessment value for the car event is "10." According to this embodiment, the assessment value is expressed on a scale of 1 to 10. The assessment value of "10" indicates that the correlation is highest and the recommendation is most effective. The assessment value of "1" indicates that the correlation is lowest and the recommendation is least effective.

(1) Generation of Time-Series Data

The analysis engine 16 of the server apparatus 10 receives assessment values that are the results of assessment fed back from the traffic control server 20. The analysis engine 16 generates time-series data from the assessment values, and adds the generated time-series data to the time-series data table 17. As a result, the time-series data of fed-back assessment values are collected with respect to each event.

Referring to FIG. 7A, the hourly assessment value 172 of the car event and the hourly assessment value 174 of the truck event are stored.

(3) Automatic Analysis of Correlation

Referring back to FIG. 6, the analysis engine 16 automatically analyzes the correlation between the collected assessment values and each input event based on the time-series data table 17, and automatically generates the filtering rule 14a from the analysis result. The analysis engine 16 calculates an assessment value of each type of event with respect to, for example, each analysis period (third period) of a day based on the assessment value of each type of event stored every hour based on the time-series data table 17. The third period does not necessarily have to be one day if the third period is longer than the above-described first period.

(4) Automatic Generation of Filtering Rule

The analysis engine 16 compares the calculated correlation coefficient value 193 and the preset threshold 183 of "±0.05" illustrated in FIG. 7B with respect to each event. In response to determining that the correlation coefficient value 193 is within the range of the threshold 183, the analysis engine 16 automatically generates the filtering rule 14a. For example, in the case illustrated in FIG. 7C, the correlation coefficient value 193 is "0.01" with respect to the car event, while the threshold 183 is "±0.05." Accordingly, the analysis engine 16 determines that the correlation coefficient value 193 is within the range of the threshold 183, and determines that the speed data of the car event are data unnecessary for avoidance or alleviation of a traffic jam through traffic control. As a result, the analysis engine 16 automatically generates the filtering rule 14a that prescribes a filtering condition that removes the car event. This allows event processing in the CEP engine to automatically sort necessary data from unnecessary data. As a result, data from which unnecessary data have been removed are input to the CEP engine 15, so that it is possible to reduce an operational load on the CEP engine 15.

For example, when it is determined that the speed data of the car event is unnecessary for avoidance or alleviation of a traffic jam through traffic control, the filtering rule 14a illustrated in FIG. 6 by way of example is automatically generated by the analysis engine 16. According to the filtering rule 14a of FIG. 6, the car event (CarEvent) is determined as a target event, and if the speed data of the car event indicate a value smaller than zero, the car event is output. There is no car event whose speed is smaller than zero. Therefore, according to the filtering rule 14a of FIG. 6, the entire car event is filtered out so as to be prevented from being input to the CEP engine 15.

A validity period may be set for the filtering rule 14a. For example, when "one year" is preset in the validity period 184 of the settings table 18 illustrated in FIG. 7B, the analysis engine 16 automatically discards the filtering rule 14a in response to passage of one year since automatic generation of the filtering rule 14a.

In the manner as described above, even when there is a change in the importance of the data of each event, it is possible to automatically generate or delete the filtering rule 14a in response to the change. As a result, it is possible to suitably set a filtering condition that filters out unnecessary data from the data of each type of event before event processing by the CEP engine 15.

A description is given above of automatic generation of the filtering rule 14a. According to this embodiment, the analysis engine 16 automatically generates the filtering rule 14a, so that it is possible to automatically sort data that need to be event-processed by the CEP engine 15 from data that do not need to be event-processed by the CEP engine 15. As a result, it is possible to reduce the amount of data input to the CEP engine 15, so that it is possible to reduce an operational load on the CEP engine 15.

Furthermore, according to this embodiment, it is possible to automatically discard the filtering rule 14a that is beyond the validity period of a filtering condition. In particular, it is preferable that a long validity period be set for the filtering rule 14a when assessment by the traffic control server 20 is highly reliable and that a short validity period be set for the filtering rule 14a when the result of assessment by the traffic control server 20 fluctuates so that the level of reliability of the assessment is low. As a result, even when the optimality of the initially determined rule may degrade with the passage of time, it is possible to prevent a decrease in the usefulness and validity of the result of the event processing due to discarding necessary data or not discarding unnecessary data before the event processing.

A description is given of a trigger for the occurrence of an event. The trigger for the occurrence of an event may be an entry of a vehicle into a road that is monitored or generation of a change of a certain amount in the speed of each vehicle. The trigger for the occurrence of an event depends on when a detection value output from an event source (generator) such as a sensor device is generated. According to this embodiment, the input events of vehicles are assumed to of a large volume such as one million TPS (transactions per second), but the number of events is not limited to this.

Next, a description is given of a trigger for a time-series analysis.

The generation period 181 and the analysis period 182 of time-series data depend on the operating conditions of the system. According to this embodiment, the generation period 181 is set to one hour and the analysis period 182 is set to one day, so that the average speed is calculated every hour and the correlation is analyzed on a daily basis. The units of time, however, do not necessarily have to be these. For example, the weekly average of each time period may be used as the time-series data, and the correlation may be analyzed on a weekly basis. The generation period 181 may be preset in the settings table 18 by a manager such as a system engineer (SE). It is preferable, however, that the generation period 181 be equal to the feedback interval in the CEP system as a whole.

Figure 8:
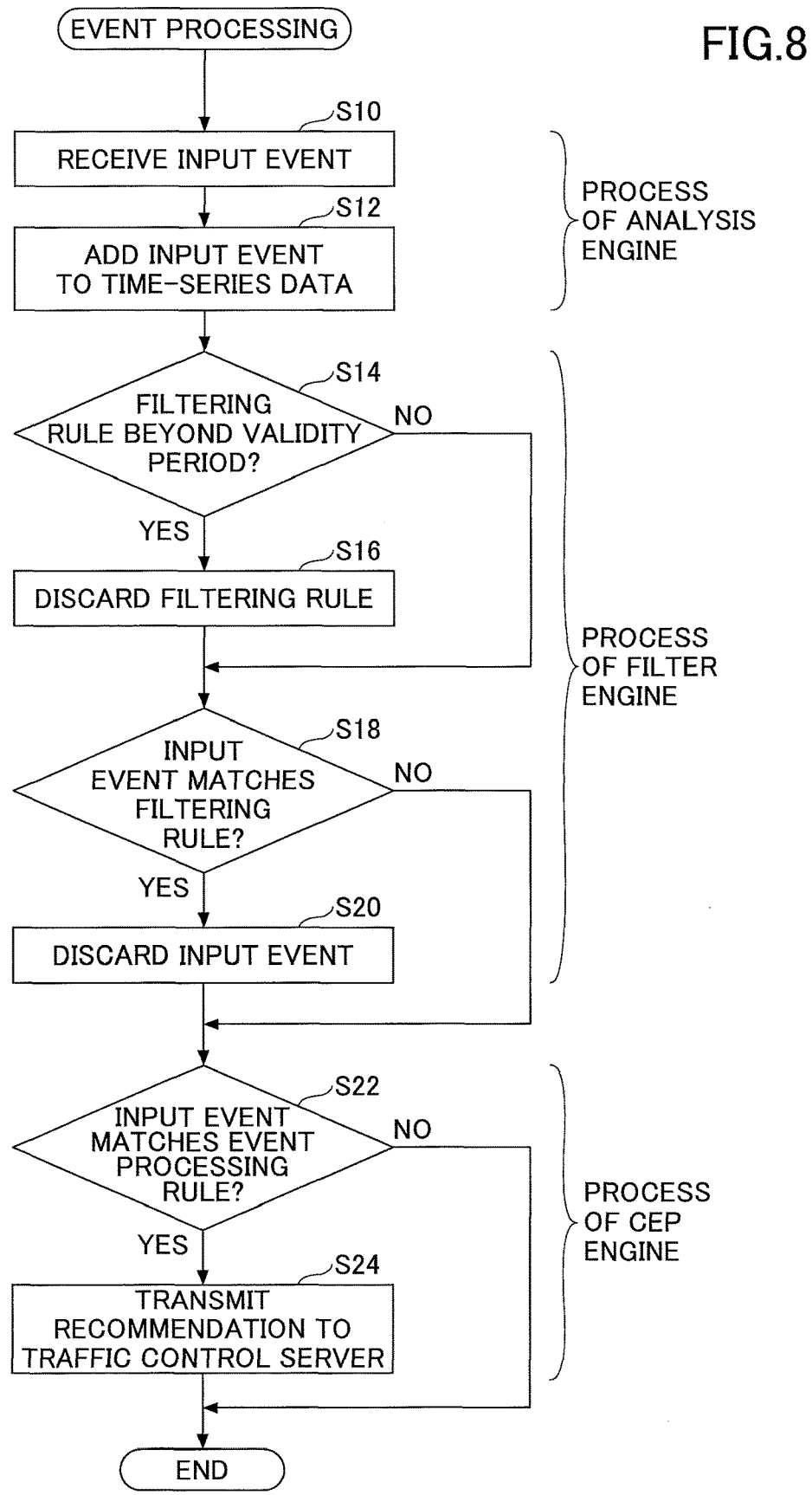
FIG. 8 is a flowchart illustrating event processing according to an embodiment.

Next, a description is given, with reference to FIG. 8, of a flow of event processing executed by the server apparatus 10 according to this embodiment.

When the event processing of FIG. 8 is started, first, at step S10, the analysis engine 16 (the reception part 4) inputs an input event. Next, at step S12, the analysis engine 16 (the analysis part 5) generates time-series data from the input event, and adds the generated time-series data to the time-series data table 17.

Next, at step S14, the filter engine 14 (the filter part 6) determines whether the filtering rule 14a is beyond the validity period 184 based on the validity period 184 of the settings table 18. In response to determining that the filtering rule 14a is beyond the validity period 184 (YES at step S14), at step S16, the filter engine 14 discards the filtering rule 14a, and proceeds to step S18. In response to determining at step S14 that the filtering rule 14a is not beyond the validity period 184 (NO at step S14), the filter engine 14 proceeds to step S18.

Next, at step S18, the filter engine 14 determines whether the input event matches the filtering rule 14a. In response to determining that the input event matches the filtering rule 14a (YES at step S18), at step S20, the filter engine 14 discards the input event, and proceeds to step S22. In response to determining that the input event does not match the filtering rule 14a (YES at step S18), the filter engine 14 proceeds to step S22. According to the example of the filtering rule 14a of FIG. 6, the car event is filtered out.

Next, at step S22, the CEP engine 15 (the event processing part 7) determines whether the input event matches the event processing rule 15a. In response to determining that the input event matches the event processing rule 15a (YES at step S22), at step S24, the CEP engine 15 transmits a recommendation to the traffic control server 20, and ends this process. In response to determining that the input event does not match the event processing rule 15a (NO at step S22), the CEP engine 15 ends this process without transmitting a recommendation to the traffic control server 20.

Figure 9:
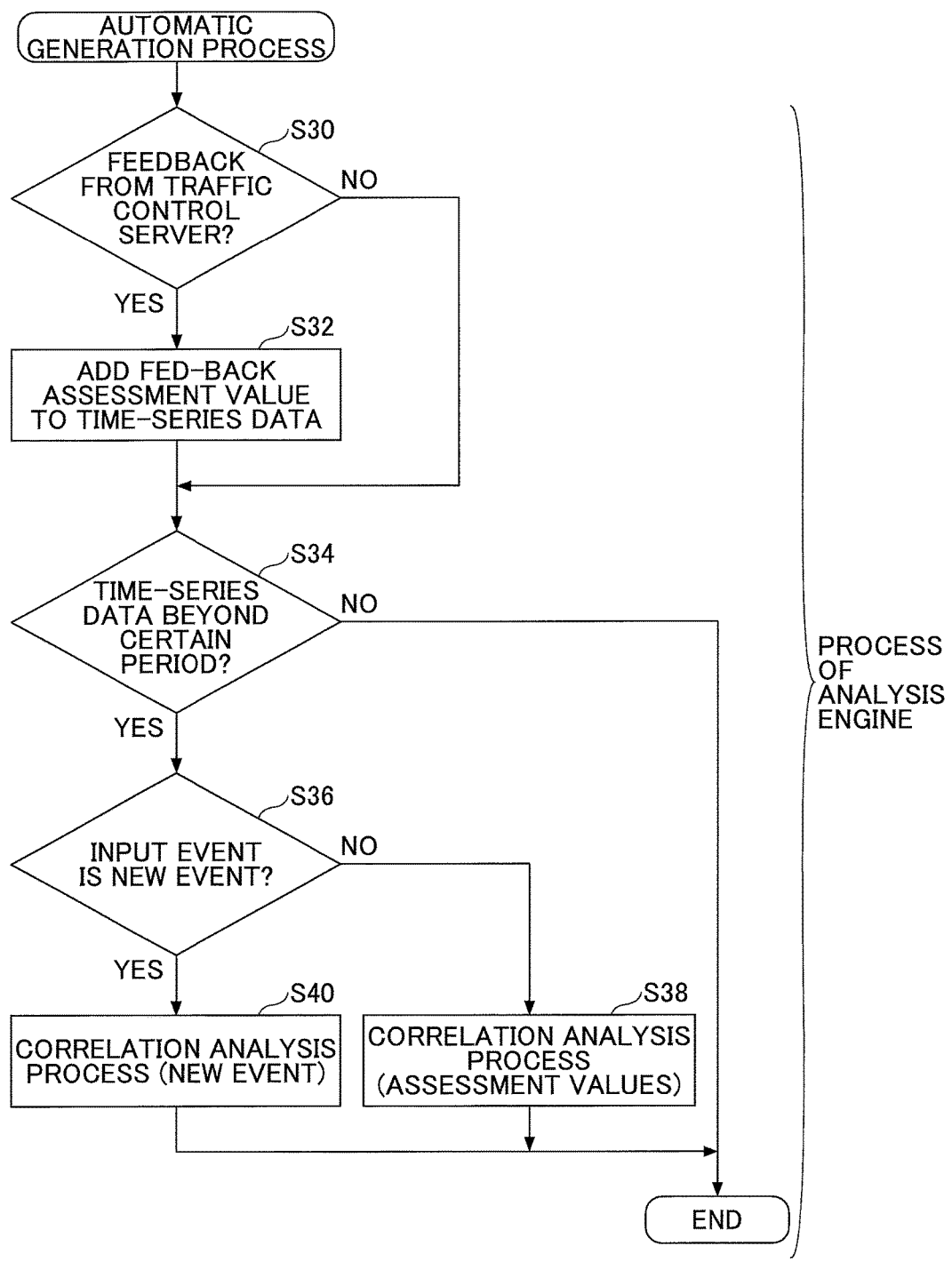
FIG. 9 is a flowchart illustrating an automatic generation process according to an embodiment.

Next, a description is given, with reference to FIG. 9, of an automatic generation process executed by the server apparatus 10 according to this embodiment. The automatic generation process of FIG. 9 executed by the server apparatus 10 is executed independent of the event processing of FIG. 8 executed by the server apparatus 10. The event processing of FIG. 8 is executed at every occurrence of an event. On the other hand, according to the automatic generation process of FIG. 9, automatic generation of a filtering rule is performed in a correlation analysis process (step S38 or S40) with assessment values transmitted from the traffic control server 20 being accumulated for a predetermined time.

When the automatic generation process is started, at step S30, the analysis engine 16 determines whether there is a feedback (reception of an assessment value) from the traffic control server 20 that is the transmission destination of a recommendation. In response to determining that there is a feedback from the traffic control server (YES at step S30), at step S32, the analysis engine 16 generates time-series data from the fed-back assessment value, stores the generated time-series data in the time-series data table 17, and proceeds to step S34. In response to determining at step S30 that there is no feedback from the traffic control server 20 (NO at step S30), the analysis engine 16 proceeds to step S34.

Next, at step S34, the analysis engine 16 determines whether the time-series data stored in the time-series data table 17 is beyond (more than) a certain time (the third period). In response to determining that the time-series data are not beyond a certain time, for example, a day (NO at step S34), the analysis engine 16 ends the process. In response to determining that the time-series data are beyond a certain time (YES at step S34), at step S36, the analysis engine 16 determines whether the input event is a new event. In response to determining that the input event is not a new event (NO at step S36), the analysis engine 16 proceeds to the correlation analysis process (assessment values) at step S38. On the other hand, in response to determining that the input event is a new event (YES at step S36), the analysis engine 16 proceeds to the correlation analysis process (new event) at step S40. The correlation analysis process (assessment values) of step S38 is executed at least once before the correlation analysis process (new event) of step S40 is executed for the first time.

Figure 10:
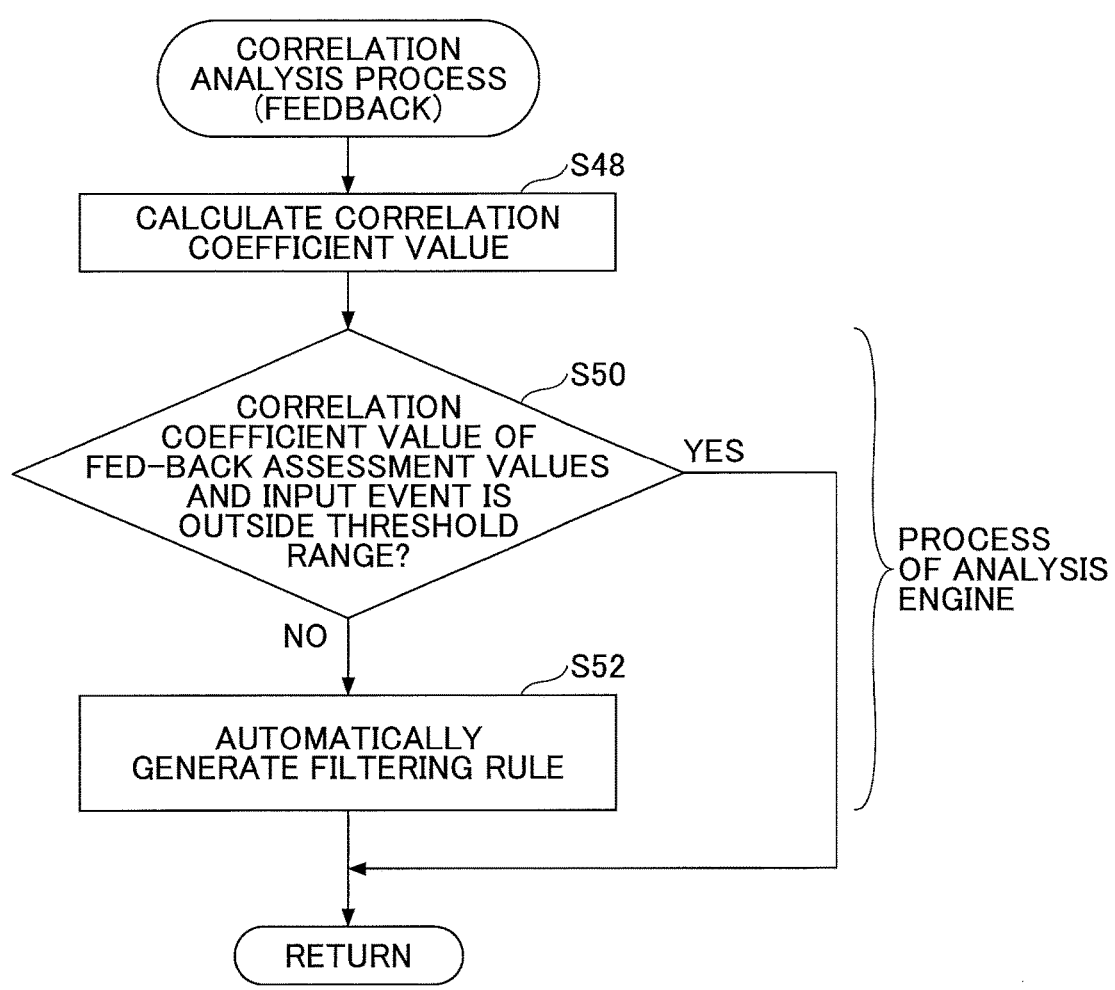
FIG. 10 is a flowchart illustrating a correlation analysis process (assessment values) according to an embodiment.
Figure 13:
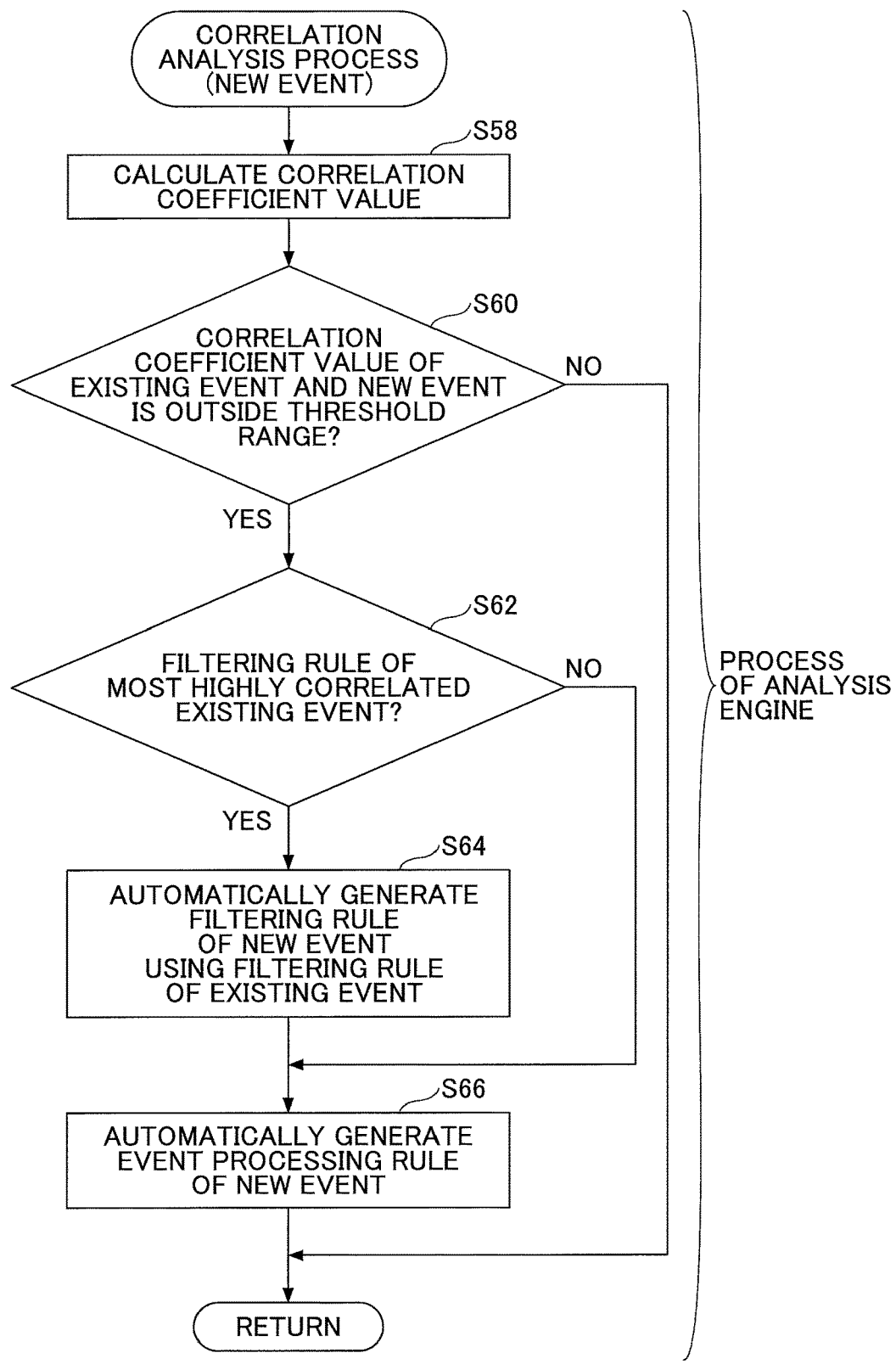
FIG. 13 is a flowchart illustrating a correlation analysis process (new event) according to an embodiment.

FIG. 10 illustrates a flowchart of the correlation analysis process (assessment values) called at step S38. FIG. 13 illustrates a flowchart of the correlation analysis process (new event) called at step S40. In the following, the correlation analysis process (assessment values) of FIG. 10 is first described, and then, the correlation analysis process (new event) of FIG. 13 is described.

When the correlation analysis process (assessment values) of FIG. 10 is started, at step S48, the analysis engine 16 calculates the correlation coefficient value of the assessment values fed back from the traffic control server 20 and the input event based on the above-described expression (1). Next, at step S50, the analysis engine 16 determines whether the calculated correlation coefficient value 193 is outside the range of the threshold 183. In response to determining that the correlation coefficient value 193 is outside the range of the threshold 183 (YES at step S50), the analysis engine 16 determines that the correlation between the assessment values and the input event is high so that the data of the input event are necessary for event processing by the CEP engine 15, and ends the process without generating the filtering rule 14a.

In response to determining at step S50 that the correlation coefficient value 193 is within the range of the threshold 183 (NO at step S50), at step S52, the analysis engine 16 determines that the correlation between the assessment values and the input event is low, and generates the filtering rule 14a and ends the process. As a result, it is possible to remove the data of an unnecessary event from the event data input to the CEP engine 15. Consequently, it is possible for the CEP engine 15 to transmit a useful recommendation to the traffic control server 20 and to reduce an operational load on the CEP engine 15 by performing event processing on the data of an event that is useful for avoiding a traffic jam.

Figure 11:
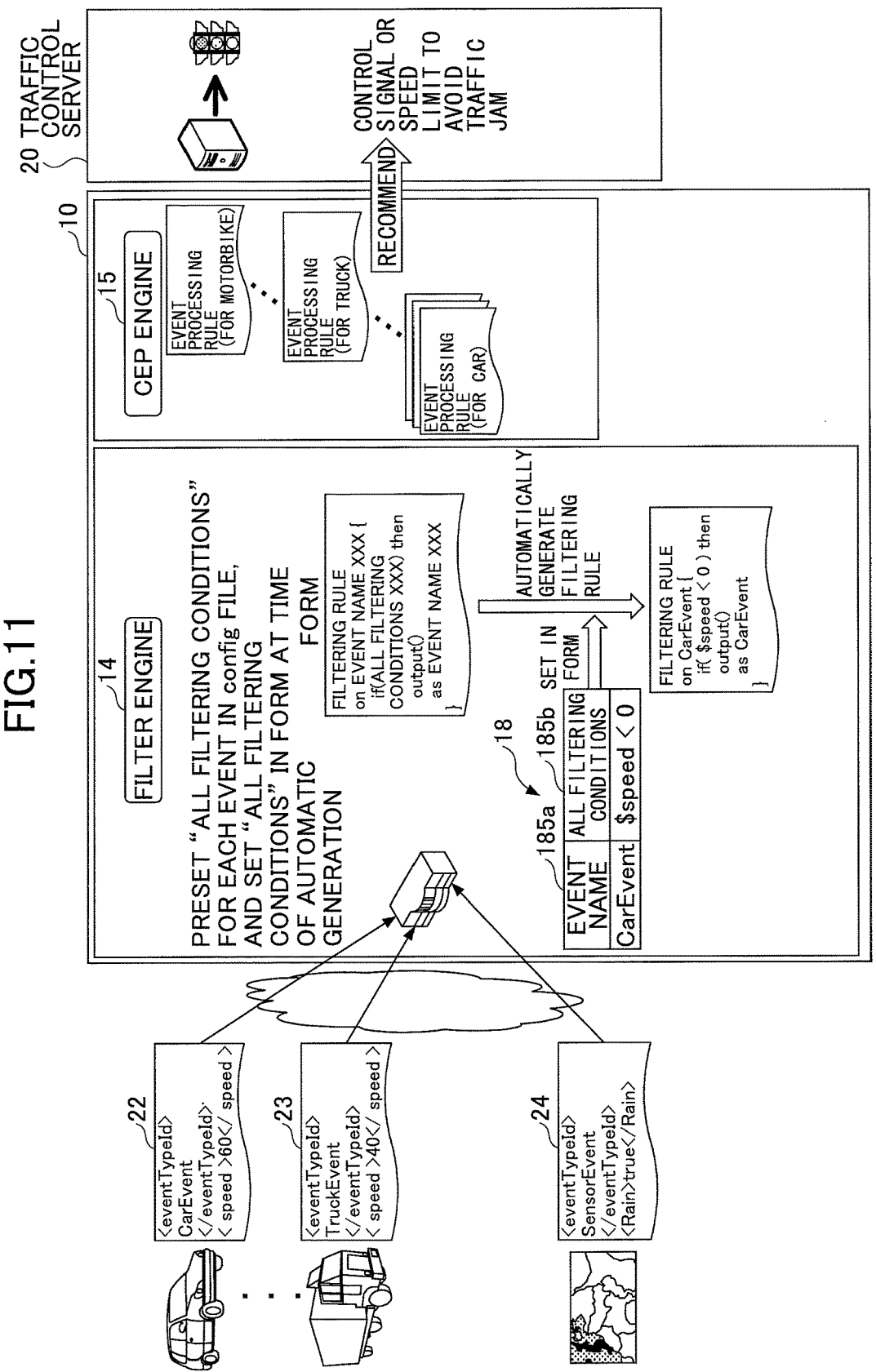
FIG. 11 is a diagram illustrating a method of automatically generating a filtering rule according to an embodiment.
Figure 12:
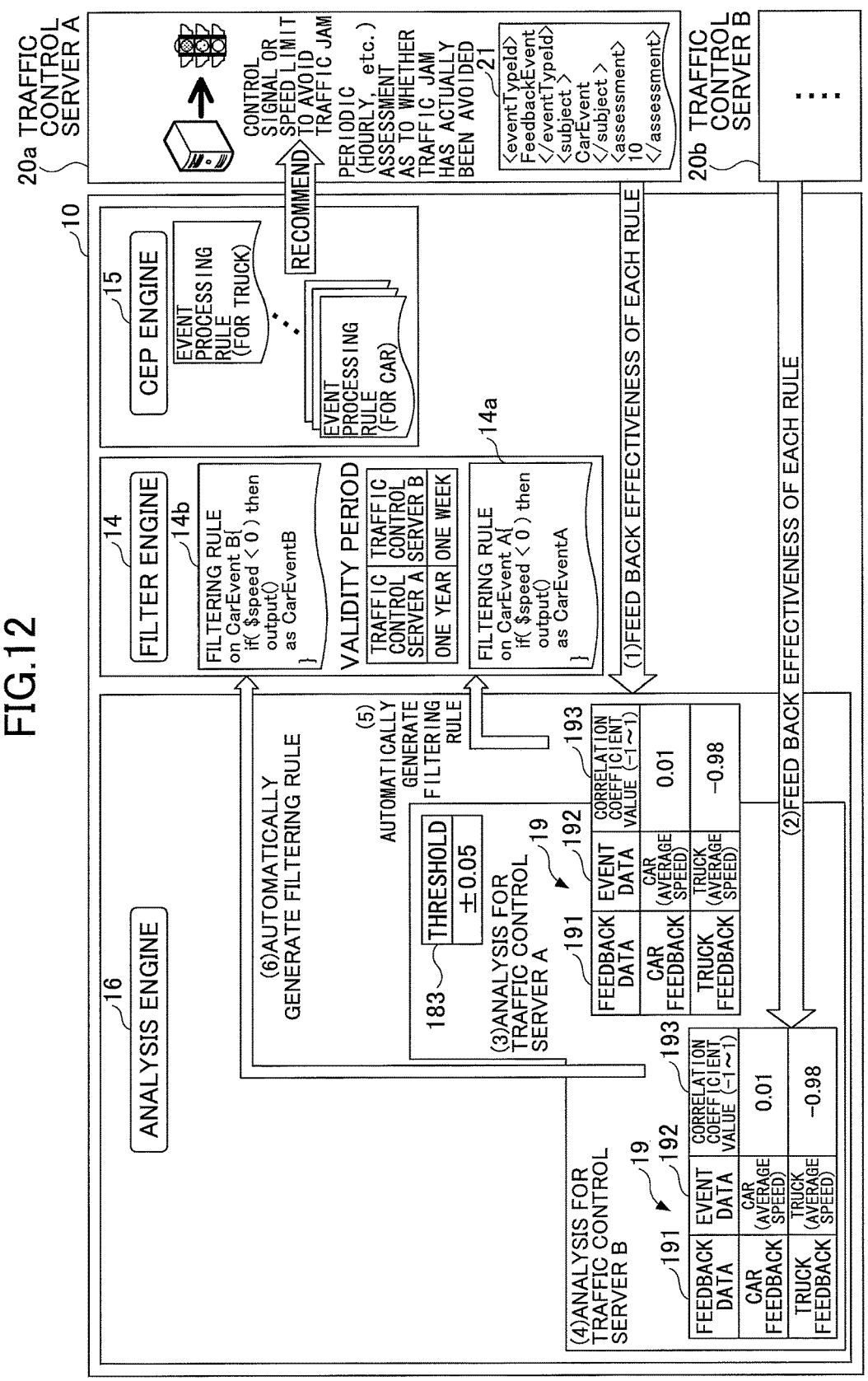
FIG. 12 is a diagram illustrating the validity period of a filtering rule according to an embodiment.

A description is given, with reference to FIGS. 11 and 12, of an example case of automatically generating a filtering rule. FIG. 11 illustrates a method of automatically generating a filtering rule according to an embodiment. For example, the manager presets "all filtering conditions" for each type of event in the settings table 18. In the case illustrated in FIG. 11, an event name 185a and all filtering conditions 185b are set in the settings table 18.

According to the automatic generation of a filtering rule, the analysis engine 16 determines a form from the settings table 18, and embeds the event name and the filtering condition(s) of an event to be subjected to filtering in the form. In the case of FIG. 11, the analysis engine 16 embeds the car event and a filtering condition in the form. As a result, it is possible to automatically generate a filtering rule, so that it is possible to save the manager from manually generating a filtering rule.

Furthermore, according to this embodiment, it is possible to set a "validity period" for the automatically generated filtering rule 14a as described above. For example, as illustrated in FIG. 12, the object of filtering of the filtering rule 14a is a car event A, and the object of filtering of a filtering rule 14b is a car event B.

As illustrated in (1), (3) and (5) of FIG. 12, the filtering rule 14a is automatically generated in order to preclude the car event based on the correlation between the assessment values fed back from a traffic control server 20a and the input event.

As illustrated in (2), (4) and (6) of FIG. 12, the filtering rule 14b is automatically generated in order to preclude the car event based on the correlation between the assessment values fed back from a traffic control server 20b and the input event.

The traffic control server 20a has controlled a road for a long time, and the level of reliability of its feedback assessment values is high. On the other hand, the traffic control server 20b controls a newly built road, and the level of reliability of its feedback assessment values is low. Accordingly, the validity period of the filtering rule 14a is set to a long period such as one year, while the validity period of the filtering rule 14*b* is set to a short period such as one week. Thus, according to this embodiment, it is possible to set the validity period of a filtering rule with respect to each traffic server, and it is possible to set a validity period with respect to each of the filtering rules 14*a* and 14*b*. As a result, even when the assessment values of a traffic server fluctuate and are thus low in reliability, it is possible to suitably sort data while continuing to operate the CEP system.

Figure 14:
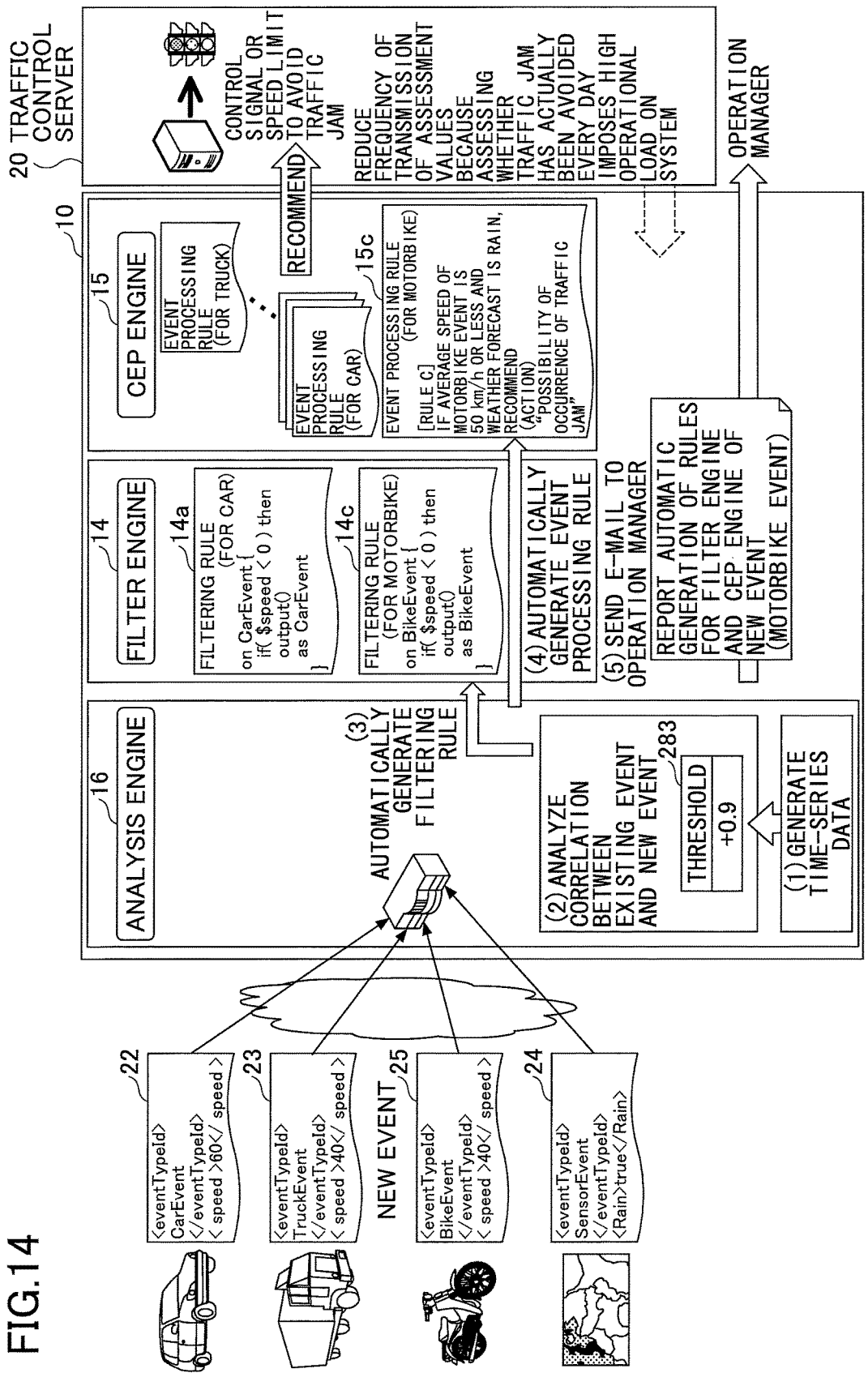
FIG. 14 is a diagram illustrating an automatic analysis of a correlation (new event) according to an embodiment.

Next, a description is given, with reference to FIGS. 13 and 14, of a process for analyzing the correlation between an event of a type that has been subjected to event processing (hereinafter also referred to as "existing event") and an event different in type from the existing event (hereinafter also referred to as "new event") in the case where the new event is input. FIG. 13 illustrates a flowchart of the correlation analysis process of a new event and an existing event. FIG. 14 illustrates, as an example of an automatic correlation analysis according to this embodiment, a case where the speed data 25 of the motorbike event that are an example of a new event different in type from the speed data 22 of the car event, the speed data 23 of the truck event and the weather data 24 of the sensor event, which are examples of existing events are input.

When the correlation analysis process (new event) of FIG. 13 is started, at step S58, the analysis engine 16 calculates the correlation coefficient value 293 of an existing event and the new event based on the above-described expression (1), and stores the calculated correlation coefficient value 293 in the second correlation table 219. Next, at step S60, the analysis engine 16 determines whether the correlation coefficient value 293 is outside the range of a preset threshold 283 based on the second correlation table 219. The threshold 283 may be a value equal to or different from the threshold 183.

The analysis engine 16 calculates the correlation coefficient value 293 of the existing event and the new event with respect each type of existing event, and determines the correlation between the existing event and the new event. As a result, the correlation with the new event is determined with respect to, for example, each of the car event and the truck event.

The analysis engine 16 calculates the correlation coefficient value 293 of new event data 194 and existing event data 195 illustrated in FIG. 15B based on the time-series data table 17 illustrated in FIG. 15A.

For example, when the new event is the motorbike event, the correlation coefficient value 293 of the new event data (motorbike event data) 194 and the existing event data (car event data) 195 is calculated from one day's data of the hourly average speed data 171 of the car event and one day's data of hourly average speed data 175 of the motorbike event stored in the time-series data table 17 illustrated in FIG. 15A.

By way of example, the correlation coefficient value 293 may be calculated using the above-described expression (1). That is, when a data string formed of two sets of numerical values (x, y) is given, their correlation coefficient value is determined by the expression (1). Here, x is the hourly average speed of each type of existing event and y is the hourly average speed of the motorbike event. Accordingly, the data string formed of the numerical values (x, y) indicates one day's data string of (the hourly average speed of each type of existing event, the hourly average speed of the motorbike event). The same is the case with the truck event. The method of calculating correlation, however, is not limited to this, and any known method of calculating correlation may be used.

The analysis engine 16 automatically generates the filtering rule 14*a* from the analysis result. The analysis engine 16 calculates the assessment value of each type of existing event with respect to each analysis period (an example of the second period) of a day based on the assessment value of each type of existing event stored every hour based on the time-series data table 17, and uses the calculated assessment value for analysis of the correlation between the each type of existing event and the new event. According to this embodiment, the analysis period (an example of the second period) does not necessarily have to be one day if the analysis period is longer than the above-described first period. The second period and the third period may be either the same period or different periods.

Referring back to FIG. 13, in response to determining at step S60 that the correlation coefficient value 293 is within the range of the threshold 283 (NO at step S60), the analysis engine 16 determines that the correlation between the new event and the existing event is low, and ends this process. Thus, when it is determined that the new event (motorbike event) is not highly correlated with any existing event, neither a filtering rule nor an event processing rule is automatically generated with respect to the new event.

On the other hand, in response to determining at step S60 that the correlation coefficient value 293 is outside the range of the threshold 283 (YES at step S60), the analysis engine 16 determines that the correlation between the new event and the existing event is high, and proceeds to step S62. At step S62, the analysis engine 16 determines whether there is a filtering rule of the most highly correlated existing event.

In response to determining at step S62 that there is a filtering rule of the most highly correlated existing event (YES at step S62), at step S64, the analysis engine 16 automatically generates a filtering rule of the new event in accordance with the filtering rule of the most highly correlated existing event. When the number of correlation coefficient values 293 outside the range of the threshold 283 is one, a filtering rule of the new event is automatically generated in accordance with the filtering rule of an existing event that corresponds to the correlation coefficient value 293 that is outside the range of the threshold 283.

For example, according to the second correlation table 219 illustrated in FIG. 15B, it is determined from the correlation coefficient value 293 that the motorbike event that is a new event is most highly correlated with the car event. Thus, for example, when such a strong correlation as is represented by the absolute value of the correlation coefficient value 293 exceeding 0.95 is recognized, it is expected that the speed of a motorbike increases as the speed of a car increases and that the speed of a motorbike decreases as the speed of a car decreases. In this case, like the car event whose correlation with a traffic jam is low, the motorbike event highly correlated with the car event is expected to have no or low correlation with a traffic jam.

The above-described expectation is specifically described. The traffic control server 20, with respect to each event, calculates an assessment value that indicates whether a traffic jam has actually been avoided by control for avoiding the traffic jam performed in response to a recommendation from the server apparatus 10, and transmits the calculated assessment value to the server apparatus 10. For example, when the assessment values transmitted from the traffic control server 20 to the server apparatus 10 are assessment values of the car event, the server apparatus 10 calculates the correlation coefficient value 193 from the assessment values of the car event and the speed data of the car event based on Eq. (1). When the coefficient correlation value 193 of the car event is within the range of the threshold 183, the server apparatus 10 determines that the correlation between the assessment values of the car event and the speed data of the car event is low. As a result, the server apparatus 10 automatically generates the filtering rule of the car event as indicated at step S52 of FIG. 10. As a result, the speed data of the car event are discarded based on the filtering rule of the car event. Thus, it is possible to discard an unnecessary event based on a filtering rule specified by assessment values of each event type.

The correlation coefficient value 293 indicates the correlation between a new event and an existing event. The server apparatus 10 calculates the correlation coefficient value 293 of a new event and an existing event based on Eq. (1). When it is determined based on the correlation coefficient value 293 that there is a high correlation between a new event and an existing event, the filtering rule of the new event is automatically generated using the filtering rule of the existing event that has been assessed based on the above-described calculated assessment values. For example, when the new event is the motorbike event and the existing event is the car event, and the correlation coefficient value 293 of the car event and the motorbike event exceeds the threshold 283, the server apparatus 10 determines that the correlation between the motorbike event and the car event is high. In this case, like the car event whose correlation with a traffic jam is low, the motorbike event highly correlated with the car event is expected to have no or low correlation with a traffic jam. As a result, the server apparatus 10 automatically generates the filtering rule of the motorbike event that is a new event using the filtering rule of the car event that is an existing event as indicated at step S64 of FIG. 13. In the case illustrated in FIG. 14, the analysis engine 16 automatically generates a filtering rule 14c that filters out the motorbike event using the filtering rule 14a of the car event. Thus, with respect to a new event determined to be highly correlated with an existing event, it is possible to automatically generate the filtering rule of the new event using the filtering rule of the existing even that has been assessed based on the above-described calculated assessment values, based on the correlation coefficient value 293 of the existing event and the new event. As a result, it is possible to suitably set a filtering condition for filtering out events before subjecting received events to event processing based on a predetermined rule.

The existing event is an example of data for event processing of a first event type, and the new event is an example of data for event processing of a second event type. The filtering rule of the existing event is an example of a first filtering condition for the first event type. The filtering rule of the new event is an example of a second filtering condition for the second event type. The generated first filtering condition and second filtering condition represent the conditions of filters that perform filtering on data for event processing received by the server apparatus 10 before inputting the received data to the event processing of FIG. 8.

According to the above description, the second filtering condition pertaining to the new event is automatically generated based on the correlation coefficient value 293 of the new event and the existing event and the first filtering condition pertaining to the existing event specified from assessment values of the existing event. This, however, is a non-limiting example, and, for example, a second filtering condition pertaining to a second existing event different in type from a first existing event may be automatically generated based on the correlation coefficient value 293 of the first existing event and the second existing event and a first filtering condition pertaining to the existing event specified from assessment values of the first existing event. For example, based on a first filtering condition of the car event, which is an example of an existing event, and the correlation coefficient value 293 of the car event and the truck event, which is another example of an existing event, a second filtering condition pertaining to the truck event may be automatically generated. This makes it possible to suitably set rules for discarding input events including existing events and a new event that change according to the time of day and road conditions.

In the case illustrated in FIG. 14, the analysis engine 16 automatically generates the filtering rule 14c for motorbikes whose filtering condition is the same as that for the filtering rule 14a for cars.

As a result, it is possible to remove the data of an unnecessary event from the event data to be input to the CEP engine 15. Consequently, it is possible for the CEP engine 15 to transmit a useful recommendation to the traffic control server 20 and to reduce an operational load on the CEP engine 15 by performing event processing on the data of an event that is useful for avoiding a traffic jam. In particular, according to this embodiment, even when there is a sudden increase in the amount of data of input events due to generation of a new event, it is possible to prevent an increase in the operational load on the CEP system.

Referring back to FIG. 13, next, at step S66, the analysis engine 16 automatically generates the event processing rule 15a, and ends this process.

The automatically generated filtering rule has a validity period, and the filtering rule that is beyond the validity period is automatically deleted. Accordingly, when the filtering rule is automatically deleted, the new event that is no more filtered out is input to the CEP engine 15. Therefore, in order to subject the new event that is no more filtered out to event processing, the event processing rule 15a is automatically generated in advance at step S66. As a result, it is possible for the CEP engine 15 to perform event processing on the new event input to the CEP engine 15 and make the new event an object of recommendation to the traffic control server 20.

Figure 16:
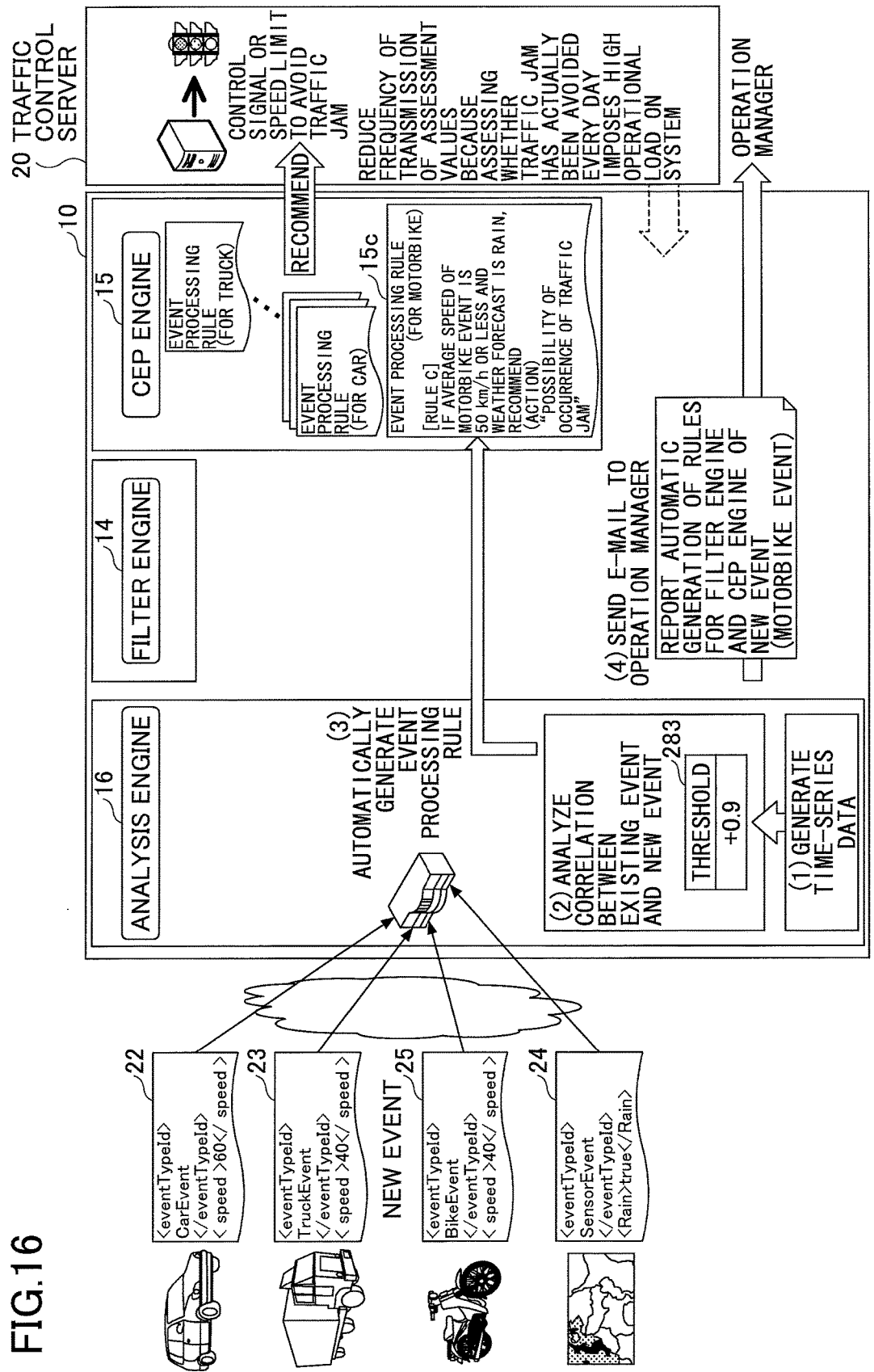
FIG. 16 is a diagram illustrating a method of automatically generating a rule for a CEP engine according to an embodiment.

For example, in the case of FIG. 16, the analysis engine 16 predicts that the motorbike event highly correlated with the truck event that is related to a traffic jam also is probably related to traffic conditions, and generates an event processing rule 15c for the motorbike event. The analysis engine 16 automatically generates the event processing rule 15c for motorbikes whose condition is the same as that of the event processing rule 15a of the truck event. As a result, it is possible for the CEP engine 15 to perform event processing on the motorbike event.

When it is determined that the new event (the motorbike event in this case) is highly correlated with none of the existing events, no event processing rule for the motorbike event is automatically generated. In this case, it is preferable that the manager manually generate the event processing rule 15a with respect to the new event as required.

In response to determining at step S62 that there is no filtering rule of the most highly correlated existing event (NO at step S62), at step S66, the analysis engine 16 automatically generates the event processing rule 15c for the new event, and ends this process.

According to this, even when a new event is input to the analysis engine 16 during operation and it takes time before the next assessment value related to feedback is obtained, it is possible to automatically analyze the correlation between an existing event and the new event based on the automatically generated event processing rule 15c for the new event. As a result, it is possible for the analysis engine 16 to automatically generate the filtering rule 14c, so that it is possible to automatically sort necessary data from unnecessary data.

After automatic generation of the filtering rule 14c illustrated at (3) of FIG. 14 and after automatic generation of the event processing rule 15c illustrated at (4) of FIG. 14, the analysis engine 16 may report automatic generation of each rule by transmitting an e-mail message to the manager as illustrated at (5) of FIG. 14. When there has been no automatic generation of a rule or when there has been a failure in automatic generation of a rule as well, the analysis engine 16 may inform the manager accordingly by e-mail.

In particular, such a situation is possible where it takes time before a reliable assessment value is obtained because of addition of a new event and a limited number of events of the new event. In this case, feeding back assessment values to the server apparatus 10 every day by the traffic control server 20 may unnecessarily increase an operational load on the CEP system. Therefore, the traffic control server 20 may reduce the frequency of transmission of assessment values according to the situation in order to prevent an increase in the operational load on the system by, for example, determining the first Monday of every month as the day of transmission of assessment values to the server apparatus 10.

Figure 18:
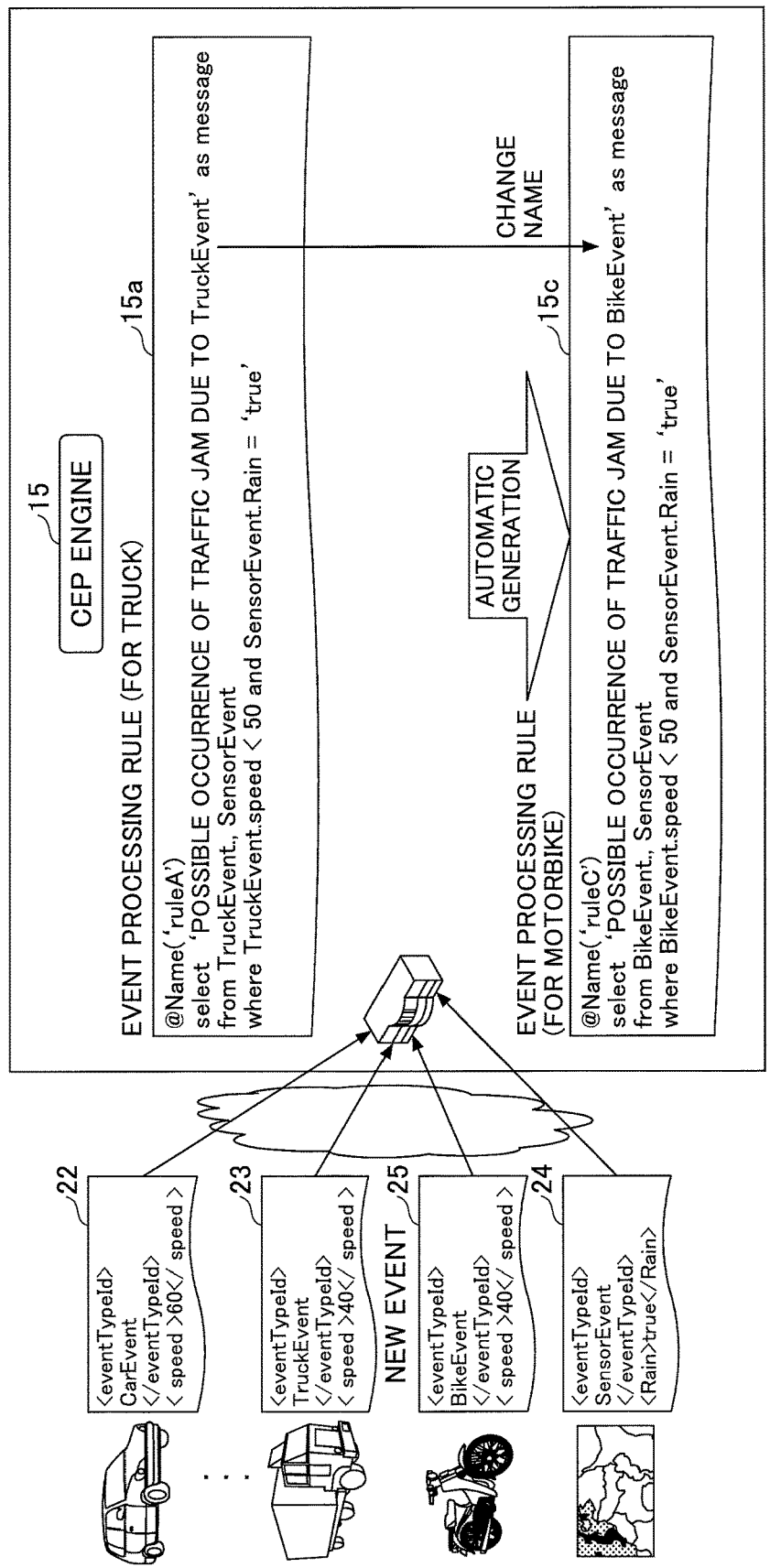
FIG. 18 is a diagram illustrating a method of automatically generating a rule for the CEP engine according to an embodiment.

Next, a description is given, with reference to FIG. 18, of an example of automatic generation of an event processing rule. FIG. 18 illustrates a method of generating an event processing rule according to an embodiment. For example, in automatically generating an event processing rule of a new event, the analysis engine 16 makes a copy of the event processing rule of an existing event for the event processing rule of the new event, and changes the name of the target event. In the case of FIG. 18, the analysis engine 16 makes a copy of the event processing rule 15a for the truck event for the event processing rule 15c of the motorbike event, and changes the event name of the target event from the truck event ("TruckEvent") to the motorbike event ("BikeEvent"). A tool for syntactic analysis of a rule is used for automatic generation of an event processing rule. As a result, it is possible to automatically generate the event processing rule 15c of the new event, thus saving the trouble of manually generating an event processing rule.

A description is given below of examples of effects.

For example, it is assumed that a manager manually sets a filtering condition for extracting necessary data and unnecessary data in order to narrow down data to be input to a CEP engine. In this case, the operational cost of the system increases. Furthermore, the setting of the filtering condition depends on the personal development skill of the manager. Therefore, it is possible that data that are appropriate as data to be input to the CEP engine are not sorted out. Furthermore, data that are necessary and data that are unnecessary to the CEP engine may vary during operation. In this case, if the filtering condition is stationary, the filtering condition is prevented from following a change in the situation during operation, so that it is impossible to input data that follow the change in the situation to the CEP engine. As a result, there may be a situation where even unnecessary data are input to the CEP engine, so that the operational load on the system is not reduced. Furthermore, it is assumed that new data have suddenly increased during operation. In this case, if it takes time to sort the new data, the operational load on the system increases, so that the processing performance of the whole system decreases.

On the other hand, according to this embodiment, the CEP system has, for example, the following functions (1) through (3) so as to be able to solve the above-described problems and to reduce an operational load on the system and perform complex event processing on rapidly increasing big data at low cost.

(1) The function of automatically analyzing and automatically sorting necessary data and unnecessary data.

(2) The function of automatically generating a filtering rule for sorted-out unnecessary data.

(3) The automatic analysis and automatic sorting functions and the function of automatically generating an event processing rule in the case of occurrence of a new event.

According to this embodiment, it is possible to automatically analyze the correlation between the assessment values fed back from a transmission destination (for example, the traffic control server 20) that uses a recommendation and the time-series data of an input event. As a result, it is possible to sort an important event from an unimportant event, so that it is possible to suitably filter out the unimportant event. Furthermore, according to this embodiment, it is possible to dynamically change the filtering condition based on the assessment values fed back from the traffic control server. Therefore, it is possible to follow a change in the situation so as to filter out data that become unnecessary in response to the change in the situation and input necessary data to the CEP engine. As a result, it is possible to reduce an operational load on the CEP system.

Furthermore, according to this embodiment, it is possible to automatically analyze the correlation between a new event and an existing event. As a result, when it is determined that the new event and the existing event are highly correlated, it is possible to automatically preclude the new event by applying the same condition as that of the filtering rule of the existing event to the new event if the new event is unnecessary. Furthermore, by applying the same condition as that of the event processing rule of the existing event to the new event, it is possible to provide the traffic control server 20 with a useful recommendation with respect to the new event.

Figure 19:
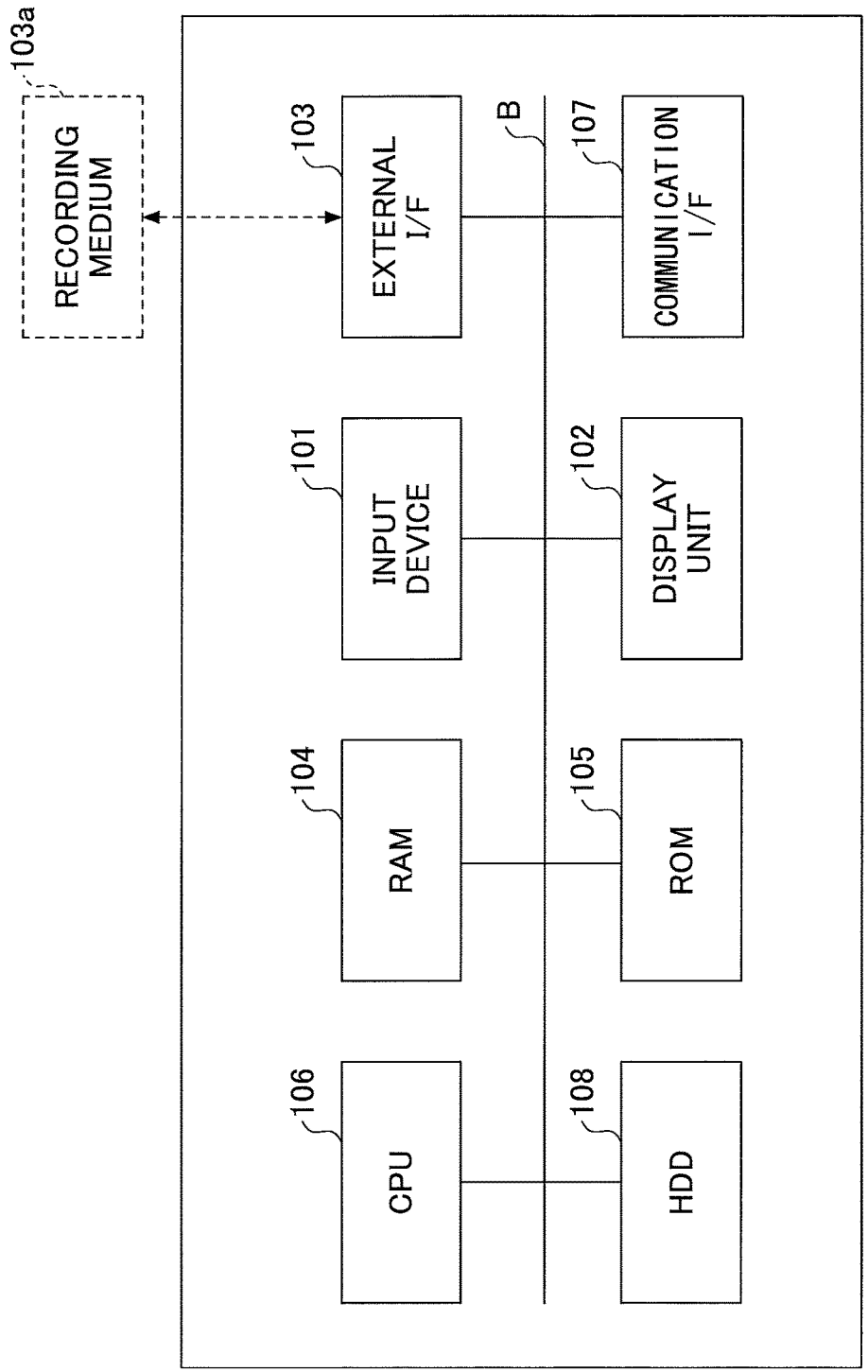
FIG. 19 is a block diagram illustrating a hardware configuration of the server apparatus according to an embodiment.

Next, a description is given, with reference to FIG. 19, of a hardware configuration of the server apparatus 10 according to this embodiment. FIG. 19 illustrates a hardware configuration of the server apparatus 10 according to this embodiment.

Referring to FIG. 19, the server apparatus 10 includes an input device 101, a display unit 102, an external interface (I/F) 103, a random access memory (RAM) 104, a read-only memory (ROM) 105, a central processing unit (CPU) 106, a communication I/F 107, and a hard disk drive (HDD) 108, all of which are interconnected via a bus B.

The input device 101 includes a keyboard and a mouse, and is used to input operation signals to the server apparatus 10. The display unit 102 includes a display, and displays various kinds of processing results.

The communication I/F 107 is an interface that connects the server apparatus 10 to a network. As a result, it is possible for the server apparatus 10 to perform data communications with the traffic control server 20 via the communication I/F 107.

The HDD 108 is a nonvolatile storage device that contains programs and data. The stored programs and data include basic software that controls the entire server apparatus 10 and application software. For example, various kinds of database information and programs are stored in the HDD 108.

The external I/F 103 is an interface with external apparatuses. Examples of external apparatuses include a recording medium 103a. As a result, it is possible for the server apparatus 10 to read and/or write to the recording medium 103a via the external I/F 103. Examples of the recording medium 103a include a compact disk (CD), a digital versatile disk (DVD), an SD memory card, and a USB (universal serial bus) memory card.

The ROM 105 is a nonvolatile semiconductor memory (storage device) capable of retaining internal data even after power is turned off. The ROM 105 contains programs and data of, for example, a network configuration. The RAM 104 is a volatile semiconductor memory (storage device) that temporarily retains programs and data. The CPU 106 is a processor that controls the entire server apparatus 10 and implements functions in the server apparatus 10 by reading a program and data from the above-described storage device (for example, the HDD 108 or the ROM 105) into the RAM 104 and executing processes.

Through the above-described hardware configuration, it is possible for the CEP system according to this embodiment to execute processes such as event processing, automatic generation of a filtering rule, and automatic generation of an event processing rule. For example, the CPU 106 executes processes such as event processing, automatic generation of a filtering rule, and automatic generation of an event processing rule by using data and a program stored in the ROM 105 or the HDD 108. The time-series data table 17, the settings table 18, the first correlation table 19, and the second correlation data table 219 may be stored in the RAM 104 or the HDD 108 or be stored in, for example, a cloud server connected to the server apparatus 10 via the network.

A description is given above of a data processing program, a data processing method, and a data processing apparatus based on the above-described one or more embodiments. All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention. Furthermore, the configurations described in the above-described embodiments may be combined as long as they are consistent. Furthermore, the above-described data processing program, data processing method, and data processing apparatus may be configured with hardware, software, or a combination of hardware and software.

For example, the configuration of the CEP system according to the above-described embodiments is an example and does not limit the scope of the present invention, and there may be various system configurations in accordance with use and purposes. For example, the system configuration where the server apparatus 10 and the traffic control server 20 are interconnected via a network is one form of the CEP system according to the present invention, and the configuration of the CEP system is not limited to this. For example, the number of server apparatuses 10 that may be included in the CEP system according to this embodiment may be one or more. In the case where multiple server apparatuses 10 are installed, the processing of event processing, automatic generation of a filtering rule, automatic generation of an event processing rule, etc., may be distributed among the multiple server apparatuses 10. All functions for executing these processes may be selectively installed in one of the multiple server apparatuses 10 in accordance with use and a purpose. Furthermore, according to the above-described embodiments, the case where the CEP engine 15 operates in the server apparatus 10 in the CEP system is illustrated, while one or more virtual machines may be caused to operate in the server apparatus 10, and the CEP engine 15 may operate in the one or more virtual machines.

Furthermore, the form of the service provided by the server apparatus 10 is not limited to making a recommendation for avoiding a traffic jam. Other forms of services that may be provided by the server apparatus 10 include, for example, inputting, as events, sensor information output from various sensors (for example, a sensor that detects rain) installed in a home and information output from home appliances, and performing event processing on the information. As a result, it is possible for the server apparatus 10 to provide the service of displaying a recommendation according to the result of the event processing on the display of each home. Examples of recommendations include messages such as "It is raining nearby. Drying laundry indoors is recommended," "The weather is not good. Hanging laundry indoors before going out is recommended," and "If you start doing laundry now, you can hang the laundry before going out."

What is claimed is:

1. A non-transitory computer-readable recording medium having stored therein an event processing control program for event processing that processes received event data in accordance with processing rules and outputs output data, the event processing control program causing a computer to execute a process comprising:
    obtaining first assessment values pertaining to output data by the event processing for a first type of events, periodically by a first period;
    calculating a correlation coefficient value of first received event data and second received event data periodically by a second period that is longer than the first period, the first received event data being received event data of the first type and the second received event data being received event data of a second type that is different from the first type of events;
    comparing the calculated correlation coefficient of the first received event data and the second received event data, and
    when the calculated correlation coefficient is greater than a threshold value,
    automatically generating a second filtering condition pertaining to the second received event data, based on a first filtering condition and the correlation coefficient value, the first filtering condition pertaining to the first received data and being specified from the assessment values,
    wherein at least one of the first filtering condition and the second filtering condition is discarded when the at least one of the first filtering condition and the second filtering condition is beyond a validity period of the at least one of the first filtering condition and the second filtering condition.

2. The non-transitory computer-readable recording medium as claimed in claim 1, wherein the first filtering condition and the second filtering condition perform filtering on the received event data before inputting the received event data to the event processing.

3. A data processing method that causes a computer to execute a process for event processing that processes received event data in accordance with processing rules and outputs output data, the process comprising:

obtaining first assessment values pertaining to output data by the event processing for a first type of events, periodically by a first period;

calculating a correlation coefficient value of first received event data and second received event data periodically by a second period that is longer than the first period, the first received event data being received event data of the first type and the second received event data being received event data of a second type that is different from the first type of events;

comparing the calculated correlation coefficient of the first received event data and the second received event data, and when the calculated correlation coefficient is greater than a threshold value automatically generating a second filtering condition pertaining to the second received event data, based on a first filtering condition and the correlation coefficient value, the first filtering condition pertaining to the first received data and being specified from the assessment values, wherein the process further comprises discarding at least one of the first filtering condition and the second filtering condition when the at least one of the first filtering condition and the second filtering condition is beyond a validity period of the at least one of the first filtering condition and the second filtering condition.

4. The data processing method as claimed in claim 3, wherein the first filtering condition and the second filtering condition perform filtering on the received event data before inputting the received event data to the event processing.

5. A data processing apparatus, comprising:
a processor; and
a memory storing an event processing control program for event processing that processes received event data in accordance with processing rules and outputs output data, the event processing control program, when executed by the processor, causing the data processing apparatus to obtain first assessment values pertaining to output data by the event processing for a first type of events, periodically by a first period;

calculate a correlation coefficient value of first received event data and second received event data periodically by a second period that is longer than the first period, the first received event data being received event data of the first type and the second received event data being received event data of a second type that is different from the first type of events;

compare the calculated correlation coefficient of the first received event data and the second received event data, and when the calculated correlation coefficient is greater than a threshold value automatically generate a second filtering condition pertaining to the second received event data, based on a first filtering condition and the correlation coefficient value, the first filtering condition pertaining to the first received data and being specified from the assessment values, wherein the data processing apparatus is further caused to discard at least one of the first filtering condition and the second filtering condition when the at least one of the first filtering condition and the second filtering condition is beyond a validity period of the at least one of the first filtering condition and the second filtering condition.

6. The data processing apparatus as claimed in claim 5, wherein the first filtering condition and the second filtering condition perform filtering on the received event data before inputting the received event data to the event processing.

* * * * *